United States Patent [19]

Kawamura et al.

[11] 4,191,458
[45] Mar. 4, 1980

[54] PHOTOGRAPHIC INFORMATION SETTING DISPLAY CIRCUIT

[75] Inventors: Masaharu Kawamura, Hino; Nobuaki Sakurada, Yokahama; Nobuhiko Shinoda, Tokyo; Fumio Ito, Yokohoma; Hiroyashu Murakami, Tokyo; Tadashi Ito, Yokohama, all of Japan

[73] Assignee: Canon Kabushiki Kaisha, Tokyo, Japan

[21] Appl. No.: 897,123

[22] Filed: Apr. 17, 1978

Related U.S. Application Data

[63] Continuation of Ser. No. 720,597, Sep. 7, 1976, abandoned.

[30] Foreign Application Priority Data

Sep. 11, 1975 [JP] Japan .................................. 50-110727

[51] Int. Cl.² ............................................ G03B 17/20
[52] U.S. Cl. .................................. 354/23 D; 354/53;
354/60 L; 354/289

[58] Field of Search ................... 354/23 D, 53, 60 A, 354/60 L, 289

[56] References Cited

U.S. PATENT DOCUMENTS

| 3,909,137 | 9/1975 | Kisanuki ........................... 354/23 D |
| 3,982,254 | 9/1976 | Ito et al. ............................ 354/23 D |
| 4,021,828 | 5/1977 | Iura et al. ............................ 354/289 |
| 4,081,813 | 3/1978 | Kawamura et al. .................. 354/289 |

FOREIGN PATENT DOCUMENTS

| 2364851 | 7/1974 | Fed. Rep. of Germany ........ 354/23 D |
| 2535329 | 8/1975 | Fed. Rep. of Germany ........ 354/23 D |

*Primary Examiner*—Russell E. Adams
*Attorney, Agent, or Firm*—Toren, McGeady and Stanger

[57] ABSTRACT

In the disclosed photographic display circuit, a counter counts pulses from a pulse generator and the exposure information to be entered is stepped while the content of the counter and that of the light measuring circuit are used to obtain an exposure value. When the data is being entered only the entered data is displayed. After entry, the resulting exposure data is displayed.

33 Claims, 24 Drawing Figures

| DIGITAL CODE | | | SHUTTER TIME (SEC) | APERTURE VALVE (F) |
|---|---|---|---|---|
| 0 | 0 | 0 | 1/8 | 2.0 |
| 0 | 0 | 1 | 1/15 | 2.8 |
| 0 | 1 | 0 | 1/30 | 4.0 |
| 0 | 1 | 1 | 1/60 | 5.6 |
| 1 | 0 | 0 | 1/125 | 8.0 |
| 1 | 0 | 1 | 1/250 | 11 |
| 1 | 1 | 0 | 1/500 | 16 |
| 1 | 1 | 1 | 1/1000 | 22 |

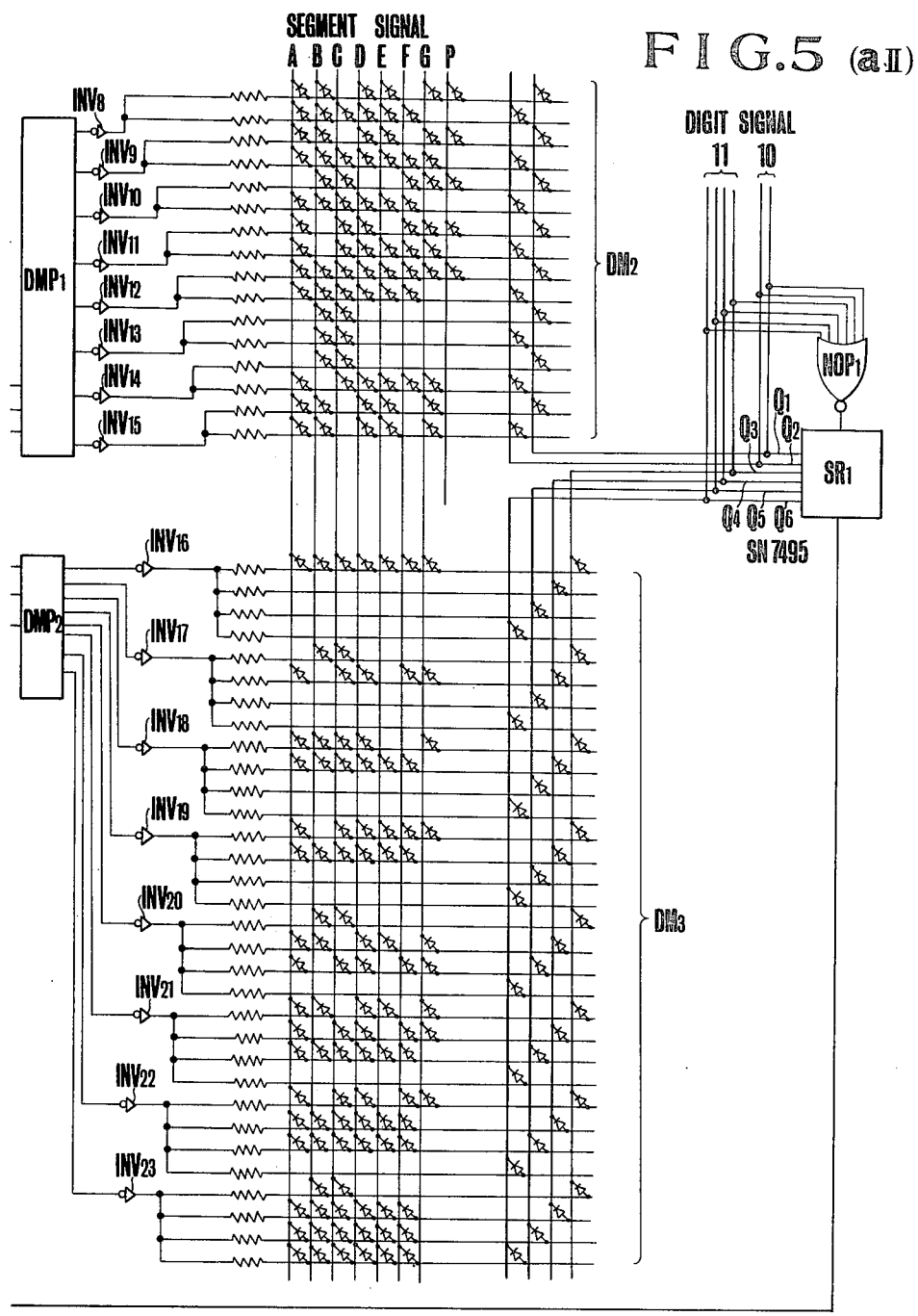
FIG.5 (aⅡ)

FIG.5 (b)

| INPUT (DG₁ OUTPUT) | OUT₃ | OUT₂ | OUT₁ |
|---|---|---|---|
| 0 | 0 | 0 | 0 |
| 1 | 0 | 0 | 0 |
| 2 | 0 | 0 | 0 |
| 3 | 0 | 0 | 0 |
| 4 | 0 | 0 | 0 |
| 5 | 0 | 0 | 0 |
| 6 | 0 | 0 | 0 |
| 7 | 0 | 0 | 0 |
| 8 | 0 | 0 | 1 |
| 9 | 0 | 1 | 0 |
| 10 | 0 | 1 | 1 |
| 11 | 1 | 0 | 0 |
| 12 | 1 | 0 | 1 |
| 13 | 1 | 1 | 0 |
| 14 | 1 | 1 | 1 |
| 15 | 1 | 1 | 1 |

FIG.5(c)

| INPUT TO DMP₁ | | | INV₈ | INV₉ | INV₁₀ | INV₁₁ | INV₁₂ | INV₁₃ | INV₁₄ | INV₁₅ | A | B | C | D | E | F | G | P | SEVEN SEGMENT INDICATION |
|---|---|---|---|---|---|---|---|---|---|---|---|---|---|---|---|---|---|---|---|
| 0 | 0 | 0 | 1 | 0 | 0 | 0 | 0 | 0 | 0 | 0 | 1 | 1 | 1 | 1 | 1 | 0 | 1 | 1 | 2.0~2.8 |
| 1 | 0 | 0 | 0 | 1 | 0 | 0 | 0 | 0 | 0 | 0 | 1 | 1 | 1 | 1 | 1 | 0 | 1 | 0 | 2.8~4.0 |
| 0 | 1 | 0 | 0 | 0 | 1 | 0 | 0 | 0 | 0 | 0 | 0 | 1 | 1 | 0 | 1 | 1 | 1 | 1 | 4.0~5.6 |
| 1 | 1 | 0 | 0 | 0 | 0 | 1 | 0 | 0 | 0 | 0 | 1 | 0 | 1 | 1 | 0 | 1 | 1 | 0 | 5.6~8.0 |
| 0 | 0 | 1 | 0 | 0 | 0 | 0 | 1 | 0 | 0 | 0 | 1 | 1 | 1 | 1 | 1 | 1 | 1 | 1 | 8.0~11 |
| 1 | 0 | 1 | 0 | 0 | 0 | 0 | 0 | 1 | 0 | 0 | 0 | 0 | 0 | 0 | 0 | 0 | 0 | 0 | 11~16 |
| 0 | 1 | 1 | 0 | 0 | 0 | 0 | 0 | 0 | 1 | 0 | 0 | 1 | 1 | 0 | 1 | 1 | 1 | 0 | 16~22 |
| 1 | 1 | 1 | 0 | 0 | 0 | 0 | 0 | 0 | 0 | 1 | 1 | 1 | 0 | 1 | 1 | 0 | 1 | 0 | 22~ |

| INPUT TO DMP2 | A B C D E F G | SEVEN SEGMENT INDICATION |
|---|---|---|
| 0 0 0 | 1 1 1 1 1 1 1<br>0 0 0 0 0 0 0<br>0 0 0 0 0 0 0<br>0 0 0 0 0 0 0 | 8 } 8 |
| 0 0 1 | 0 1 1 0 0 0 0<br>1 0 1 1 0 1 1<br>0 0 0 0 0 0 0<br>0 0 0 0 0 0 0 | 1<br>5 } 15 |
| 0 1 0 | 1 1 1 1 0 0 1<br>1 1 1 1 1 1 0<br>0 0 0 0 0 0 0<br>0 0 0 0 0 0 0 | 3<br>0 } 30 |
| 0 1 1 | 1 0 1 1 1 1 1<br>1 1 1 1 1 1 0<br>0 0 0 0 0 0 0<br>0 0 0 0 0 0 0 | 5<br>0 } 50 |
| 1 0 0 | 0 1 1 0 0 0 0<br>1 1 0 1 1 0 1<br>1 0 1 1 0 1 1<br>0 0 0 0 0 0 0 | 1<br>2<br>5 } 125 |
| 1 0 1 | 1 1 0 1 1 0 1<br>1 0 1 1 0 1 1<br>1 1 1 1 1 1 0<br>0 0 0 0 0 0 0 | 2<br>5<br>0 } 250 |
| 1 1 0 | 1 0 1 1 0 1 1<br>1 1 1 1 1 1 0<br>1 1 1 1 1 1 0<br>0 0 0 0 0 0 0 | 5<br>0<br>0 } 500 |
| 1 1 1 | 0 1 1 0 0 0 0<br>1 1 1 1 1 1 0<br>1 1 1 1 1 1 0<br>1 1 1 1 1 1 0 | 1<br>0<br>0<br>0 } 1000 |

SS1  SS2  SS3  SS4  SS5  SS6

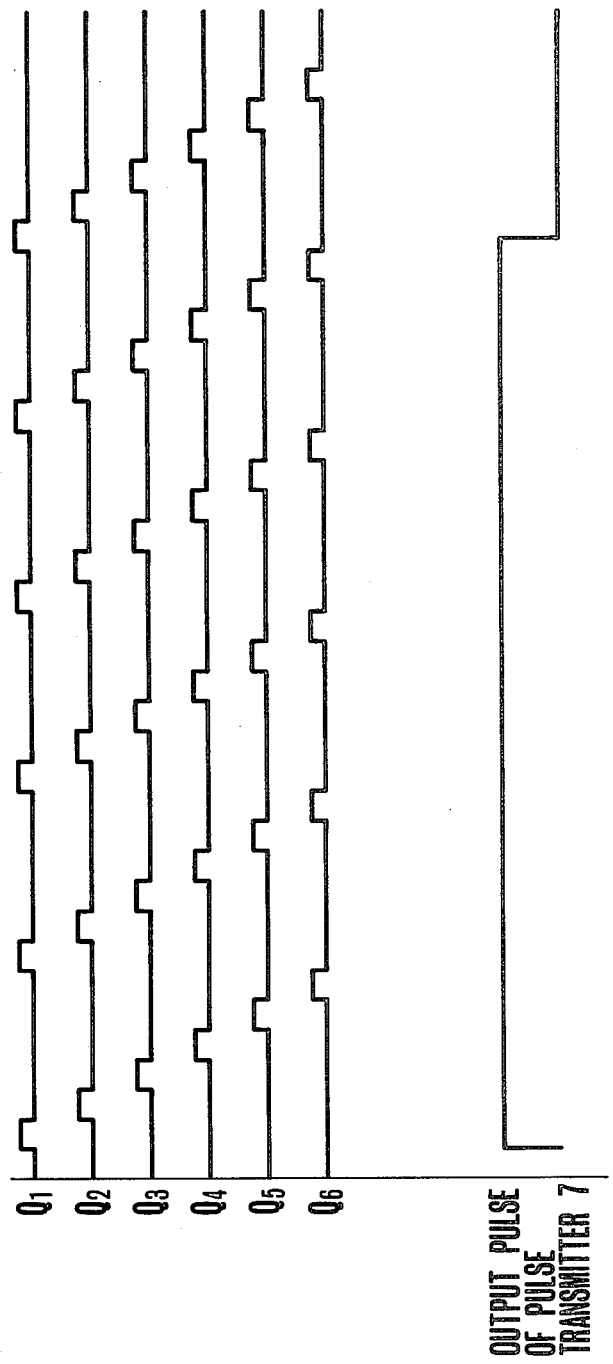

FIG.7

| INPUT | | | | OUTPUT SS₃~SS₆ SHUTTER INDICATION | SS₁ SS₂ APERTURE INDICATION |
|---|---|---|---|---|---|
| LINE 17 | LINE 12 | LINE 16 | LINE 14 | | |
| 1 | 0 | 1 | × | ○ | ○ |
| 0 | 0 | 1 | 1 | ○ | ☼ |
| 0 | 0 | 1 | 0 | ☼ | ○ |
| 0 | 0 | 0 | 1 | ☼ | ☼ |
| 0 | 0 | 0 | 0 | ☼ | ☼ |
| 1 | 1 | 1 | 1 | ○ | ☼ |
| 0 | 1 | 1 | 1 | ○ | ☼ |
| 1 | 1 | 1 | 0 | ☼ | ○ |
| 0 | 1 | 1 | 0 | ☼ | ○ |
| 0 | 1 | 0 | 1 | ☼ | ☼ |
| 0 | 1 | 0 | 0 | ☼ | ☼ |

PHOTOGRAPHIC INFORMATION SETTING DISPLAY CIRCUIT

This is a continuation of application Ser. No. 720,597 filed Sept. 7, 1976, now abandoned.

FIELD OF THE INVENTION

The present invention relates to a circuit for displaying a shutter time an aperture value or other photographic data in a camera or other device.

DESCRIPTION OF THE PRIOR ART

A conventional camera with an exposure control circuit is adjusted by setting a variable member in the circuit. The position of the variable member is changed by manually operating mechanical information setting mechanisms such as a shutter dial, an aperture ring, etc. functionally engaged with a circuit member. To take a photograph, it is necessary to operate the setting mechanism provided on the camera body or the lens. This is very inconvenient for quick operation.

It has been proposed by the applicant of the present invention that pushing down a button on the camera could cause the pulses to be counted up or down in a counter. The content of the counter is then counted up or down so as successively to step the value of one exposure setting until the value reaches a certain desired entry value. When the push button is released the content of the counter is set at an entry value corresponding to the desired value. A calculated or "operated" values is then produced. In such a system it is difficult to determine which of the displayed value is the set value and which the calculated value. Furthermore it is difficult to judge whether the set value has reached a limit or whether the calculated value is within the controllable range. It is also inconvenient to have to continue pushing down the push button.

SUMMARY OF THE PRESENT INVENTION

A purpose of the present invention is to improve display circuits.

Another purpose of the present invention is to offer a display circuit which displays only the set value while the information is stepped and displays the calculated value when the push button is released in such a manner that the set value can clearly be distinguished from the calculated value.

Still another purpose of the present invention is to offer a display circuit which automatically stops the setting operation, and senses when the set value reaches the limit value while the information is stepped in accordance with the above mentioned method and display that the set value reaches the limit value.

Further another purpose of the present invention is to offer a display circuit which automatically stops the setting operation, and senses and displays when the calculated value goes out of the controllable range when the information is stepped.

Other purposes of the present invention will be disclosed in the following explanation of an embodiment of the present invention.

BRIEF DESCRIPTION OF THE DRAWINGS

FIG. 7 shows a table for showing the relation between the display modes of the 7-segments and the signals from the input lines shown in FIG. 6.

DESCRIPTION OF THE PREFERRED EMBODIMENT

Figure 1:
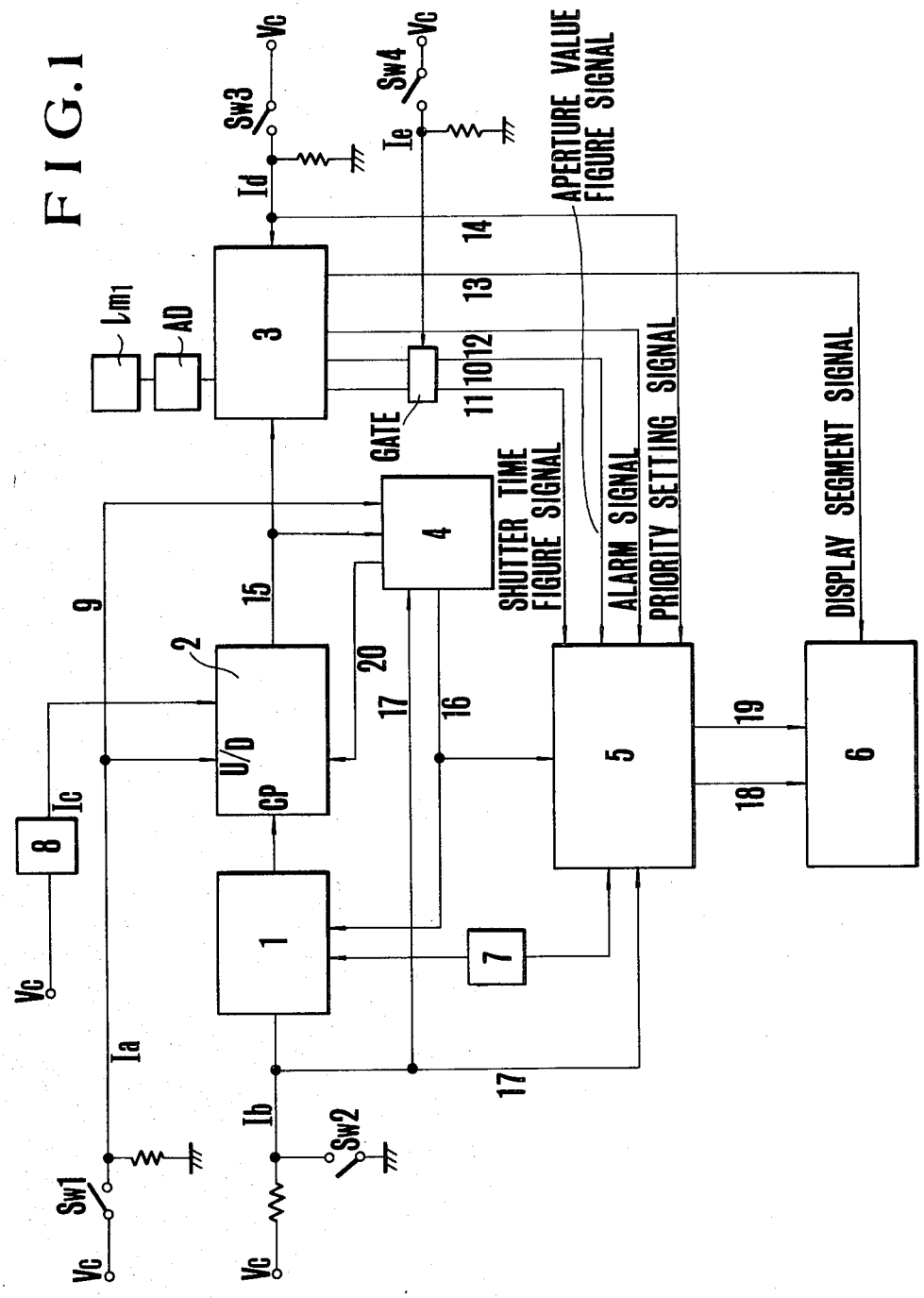
FIG. 1 shows a block diagram of an embodiment of the photographic information setting display circuit in accordance with the present invention.

FIG. 1 shows a block diagram of a photographic information setting display circuit embodying the present invention. In the drawing, the input terminals and the output terminals are the transmitting terminals of the input signals and the output signals from various parts of the digital control system camera. Terminals Vc are connected to one electrode of a camera power source whose other electrode is connected to the parts grounded. An input terminal Ia of a circuit for changing the direction along which the set value is stepped, delivers a logic "1" to the transmission line 9 when the switch Sw1 is closed and a logic "0" when the switch Sw1 is open. When the input from the line 9 is "1", a up-down counter 2 counts up, and counts down when the input from the 9 is "0". A terminal for Ib controls the clock pulses for the above counting, delivers a "0" signal to the transmission line 17 when the switch Sw2 is closed and delivers a "1" signal when the switch Sw2 is open. The clock pulses are generated in the clock pulse generator 7, so that the set values and others are stepped in time. The clock pulses generated in the generator 7 are applied to the clock pulse input of the up-down counter 2 through the clock input control device 1, where they are counted stepwise, up and down in accordance the instructions from the line 9. Further the clock input control signal from line Ib is also transmitted to a counter control device 4 and a display control device 5 through the line 17. A terminal Ic constitutes the power source of the up-down counter 2. The self holding effect of the timer inserted in the circuit causes current to be supplied to the counter for a given time even if the power source of the device is interrupted. A light measuring circuit lM1 includes a light sensing element. An exposure operation circuit 3 receives the brightness information at the output of the light measuring circuit lM1 through the A-D converting circuit AD, priority instruction signal from the terminal Id and the output signal 15 of the counter 2. The circuit 3 then produces a shutter display signal, an aperture display signal and various other signals shown in the drawing to be transmitted to the display control device 5.

When a priority mode selector switch set for shutter Sw3 is closed the camera is operated with priority while when Sw3 is open the camera is set for aperture priority. Of the signals transmitted from the exposure operation circuit 3 to the display control device 5 the aperture figure signal and the shutter figure signal along the lines 10 and 11 are transmitted through the gates controlled by the signals from the terminal Ie. The display is turned on or off in accordance with the closing and the opening of a switch Sw4. Alarm signals for displaying various alarms are transmitted directly to the display control device 5 by a line 12, while the display segment signal is directly transmitted to the display device 6 from the exposure operation circuit 3. The output 15 of the up-down counter 2 is applied to the exposure operation circuit 3 and the counter control circuit 4, while the clock control signal 17 to the above mentioned clock input control device 1 is also applied to the circuit 4. A counter control signal passes from the circuit 4 and through the line 20 to the parallel presettable input terminal of the up-down counter 2. The output 16 of the circuit 4 is delivered to the clock input control device 1 as well as the display control device 5, so as to control their operations. The clock pulses from the clock pulse generator 7, the signal 16 from the counter control device 4 and the signal from the line 17 appear at the display control device 5 which serves to carry out the control operation for various displays by means of various instructions 10, 11 and 12, 14 from the exposure operation circuit 3. The device 5 produces a shutter time display signal 18 and the aperture value display signal at its output. These display signals appear at the display device which displays various data such as in a view finder in response to a segment instruction from the operation circuit 3. The display device is composed of a combination of conventional elements, a digit driver, a 7-segment LED and other display elements.

In the operation of FIG. 1 a shutter priority photograph is taken while the switch Sw4 is closed. In order to change the mode, the switch Sw3 and the information setting switch Sw2 are closed along with the switch Sw1 so that the pulses from the clock pulse generator are applied clock input control device 1, so as to be transmitted to the counter 2. As the switch Sw1 is closed the counter 2 counts input pulses up to deliver a digital output corresponding to the set shutter time along the line 15. The operation circuit 3 uses the digital value supplied through the line 15 and the object brightness information obtained by means of the light measurement cicuit lm and converted into a digital value by means of the A-D converter AD to produce an aperture value.

The set shutter time value and the thus produced aperture value are transmitted to the display device through the line 13, so as to display the shutter time value and the aperture value. When the digital value from the line 15 corresponding to the set shutter time reaches a limit value, the counter control device 4 delivers the limit value signal to the clock input control device 1 through the line 16 so as to interrupt the input pulses into the counter 2 from the clock pulse generator 7, holding the content of the counter 2 and the set limit value. When, the aperture value produced surpasses the controlable limit value of the camera the exposure operation circuit 3 delivers an alarm signal to the display control device 5 through the line 12. The display control device 5 decides the transmission mode of the shutter digit signal produced in the operation circuit 3, the aperture digit signal to the display device 6 in accordance with the above mentioned input limit value signal from the line 16, the alarm signal and the mode signal. The device 5 varies the display mode in accordance with the set state of the set value, the operation results and so on in such a manner that the photographer learns the set state of the set value, the operation result and so on so as to be able to judge whether a proper exposure can be obtained.

So far the outline of the photographic information display circuit in accordance with the present information has been explained in accordance with FIG. 1. Below the embodiment of each device constituting each block shown in FIG. 1 will be explained in detail in accordance with the drawings after FIG. 2. Below the parts presenting the same figures as those in FIG. 1 are the same parts.

Figure 2:
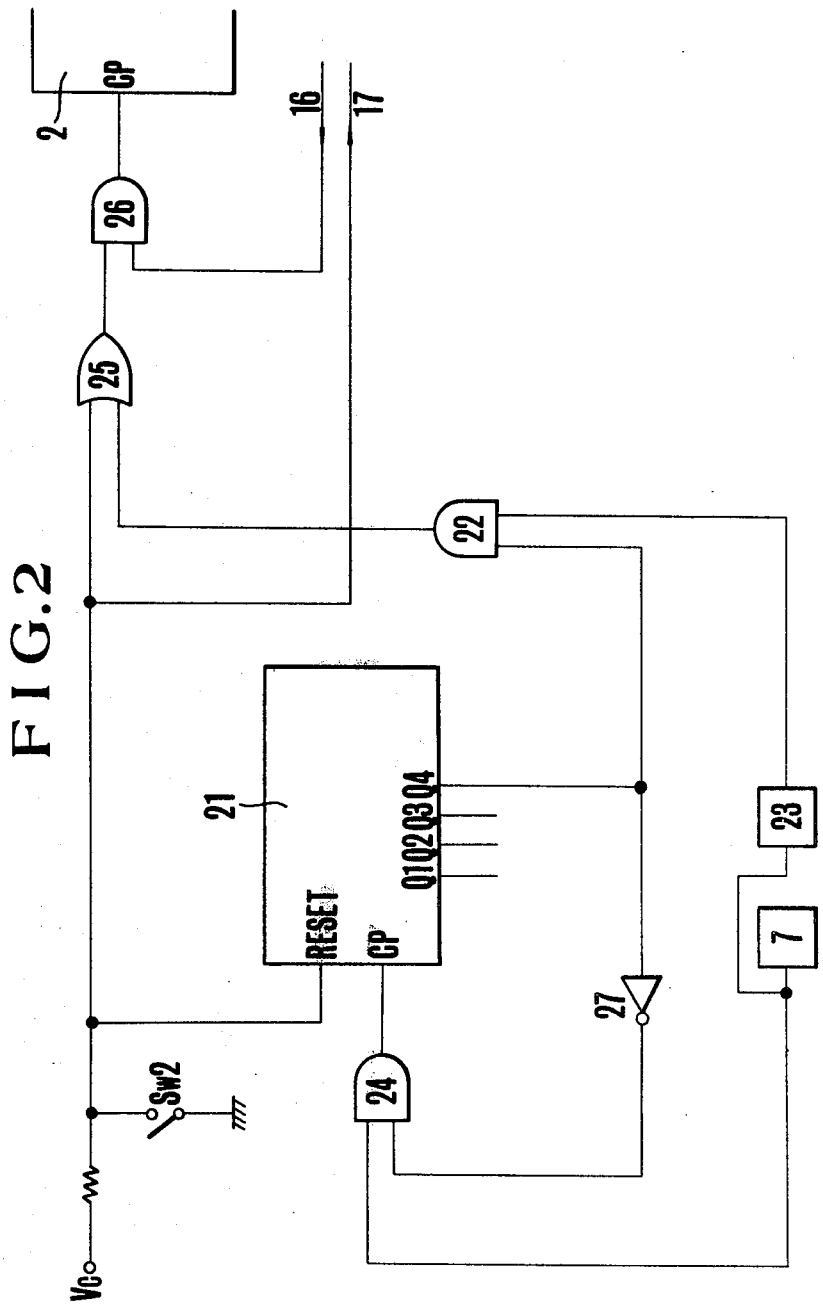
FIG. 2 shows a circuit composition of an embodiment of the clock input control device shown in FIG. 1.

FIG. 2 shows a circuit composition of an embodiment of the clock input control device 1 shown in FIG. 1 while FIG. 5(g) shows an example of the timing chart of the device shown in FIG. 2. In the drawing, 24 is an AND gate, to whose one input terminal the pulses (FIG. 5(g)(1)) from the pulse generator 7 are applied and whose other input terminal is connected to the output terminal Q4 of the up-down counter 21 through the inverter 27. 23 is a divider for dividing the pulses produced in the pulse generator 7 so as to deliver the pulses as is shown in FIG. 5(g)(2). 22 is an AND gate whose one input terminal is connected to the output terminal Q4 and whose other input terminal is connected to the output terminal of the divider 23. 25 is an OR gate while 26 is an AND gate. The operation of the circuit will be explained briefly in accordance with FIG. 5(g). When the switch Sw2 is closed for a short time as is shown in FIG. 5(g)(3), the pulses as is shown in FIG. 5(g)(4) are applied to the CP input terminal of the counter 2 through the OR gate 25 and the AND gate 26, whereby the counter 2 counts one pulse in synchronization with the rising up of the pulse. When the switch Sw2 is closed for a long time as is shown in FIG. 5(g)(5), the resetting of the counter 21 is released in such a manner that the pulses from the pulse generator 7 is transmitted to the counter 21 through the AND gate 24, whereby after a certain determined number of the pulses have been counted the output terminal Q4 delivers an output as is shown in FIG. 5(g)(6). Thus the AND gate 22 is opened in such a manner that the output of the divider 23 is transmitted to the counter 2 as is shown in FIG. 5(g)(7) through the gate 22 and the OR gate 25 and the AND gate 26, whereby the pulses are counted so far as the switch Sw2 is closed. In this way, the up-down counter 2 varies one step at the same time with the opening of the switch Sw2, and carries out a quick step variation at an interval of a certain determined time.

Figures 3, 4:
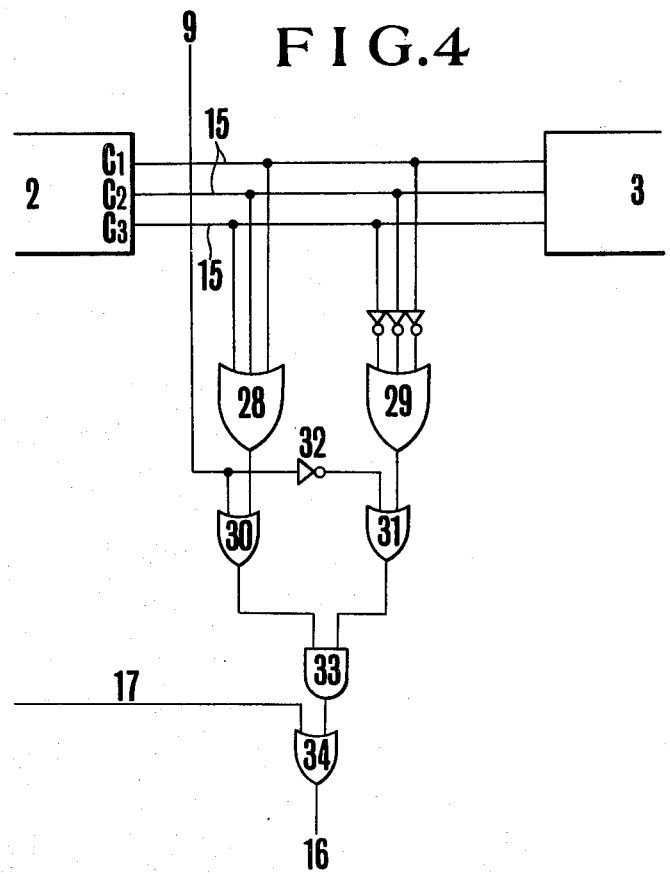
FIG. 3 shows a table for showing the relation between the shutter time value and the diaphragm value for 3 digital value used in the present invention.
FIG. 4 shows a circuit diagram of an embodiment of the counter control device shown in FIG. 1.

FIG. 4 shows a circuit composition of an embodiment of the counter control device 4 shown in FIG. 1. The outputs C1–C3 of the up-down counter 2 in the drawing are delivered to the exposure operation circuit through the line 15 and also to the OR gates 28, 29 of the counter control device. The outputs of the OR gates 28, 29 are delivered to the OR gates 30, 31 together with the up-down direction change over signal from the line 9 in such a manner that the outputs of the OR gates 30, 31 are processed in the AND gate 33 and delivered to the line 16 as the counter control output through the OR gate 34. Hereby the signal for controlling the clock input (FIG. 5(g)(3) or (5)) is delivered to the OR gate 34 from the line 17.

Namely the output of the line 16 is "0" signal (low level signal) in the above mentioned circuit only when the content of the counter 2 is "1 1 1" and the count up signal of "1" signal (high level signal) is delivered from the line 9 and only when the content of the counter is "0 0 0" and the count down signal of "0" is delivered from the line 9, while the output from the line 16 is "0" signal only when the set value is the upper settable or the lower settable limit and yet the count up or the count down is tried to be carried out.

FIG. 5(a) shows a circuit diagram of an embodiment of the exposure operation circuit 3, the light measurement lm and the A-D converter AD shown in FIG. 2. In the drawing, CdS is a light sensing element, while Di is a diode whereby a voltage corresponding to the brightness is produced at the connecting point of CdS with Di. Tr1 is a transistor with whose emitter a variable resistance VR1 whose value is variable in functional engagement with the film sensitivity setting dial (not shown in the drawing) is connected and with whose collector the condenser C1 is connected, whereby the condenser C1 is charged in accordance with the brightness and the film sensitivity. Tr2 and Tr3 are the transistors constituting a switching circuit for inversing the output state when the terminal voltage of the condenser C1 reaches a certain determined voltage. In this way, the inversed time of Tr3 corresponds with the object brightness and the film sensitivity. Tr4 is a transistor connected to the output terminal of the frequency divider dv1 repeating switching on and off at the time interval corresponding to the output of the frequency divider. Tr5 and Tr6 are the transistors repeating switching on and off at the time interval of the output of the frequency divider dv1. The light measurement circuit lm1 is composed as mentioned above while the transistors Tr4 and Tr5 are opened in accordance with the output of the frequency divider dv1 and the transistor Tr3 is opened after the elapse of the time corresponding to the brightness and the film sensitivity. cp1 is the clock pulse generator, dv1 the frequency divider for dividing the frequency of the pulses, AND1 the AND gate whose input terminal is connected to the transistor Tr3, the clock pulse generator cp1 and the frequency divider dv1, allowing the passage of the pulses from cp1 during the inversed time of the transistor Tr3. ct is the counter connected to the AND gate AND1, whereby its reset terminal is connected to the frequency divider dv1 through the inverter INV so as to be reset when the pulses from the freqency divider dv1 are low level signal. LACH is the lach circuit for laching the content of the counter ct at the same time with the switching off of transistor Tr3. The A-D converter AD is composed as mentioned above. INV-1–INV3 are the inverters, ad1 the full adder for adding the output of the lach circuit LACH through the inverter to the content of the register rm1 normally storing "1 1 1" (7 in decimal). sub1 is a full subtractor whose one input is connected to the output of ad1 and whose other input terminals are connected to the output terminals C1–C3 of the above mentioned up-down counter 2 whereby the content of the counter 2 is subtracted from the output of ad1. DC1 is the 4 line to 16 line decoder for decoding the content of sub1 whereby only the output terminals corresponding to the content of sub1 are at low level. DM1 is a diode matrix, NAND1 a NAND gate whose output terminal is connected to the line 12 so as to deliver "1" signal only when the output terminals 0–6, 15 of DC1 are at low level. Either of the output terminals 0–6, 15 of DC1 is at low level only when, as is clear from FIG. 3(b), an operation result above the controlable operation value "0 0 0"–"1 1 1" (the controlable shutter time value and the controlable aperture value in FIG. 3) formed by the outputs of the output terminals 7–14 is produced, whereby the fact that the signal of the line 12 is "1" means that the operation result is beyond the controlable range, INV4–INV6 are the inverters, DS1-1–DS1-3, DS2-1–DS2-3 are the AND gates constituting the selector DSl1, whereby each AND gate DS1-1–DS1-3 is connected to the line 14 while each AND gate DS2-1–DS2-3 is connected to the line 14 through the inverter INV7. DSl2 and DSl3 are the selectors composed in a similar way as in case of the selector DSl1, DMP1 the DEMULTIPLEXER connected to the output terminal of the selector DSl2 so as to decode the output of DSl2. DMP2 the DEMULTIPLEXER connected to DSl3 so as to decode the output of DSL3. DEMULTIPLEXERS DMP1 and DMP2 are so designed as to deliver low level outputs to the determined lines in accordance with the input. INV-8–INV23 are the inverters, DM2 and DM3 are the diode matrixes for converting the outputs of DMP1 and DMP2 into the segment signals for the 7-element display. NOR1 is the NOR gate and SR1 is a shift register for constituting a ring counter together with NOR1 so as to produce outputs at the output terminals Q1–Q6 one after another in synchronization of the clock pulses from cp1. Hereby the output of Q1–Q6 is the digit signal of 7-element. Further in case of the diode matrix DM1–DM3, the diodes are arranged as is shown in the drawing.

Figure 5:
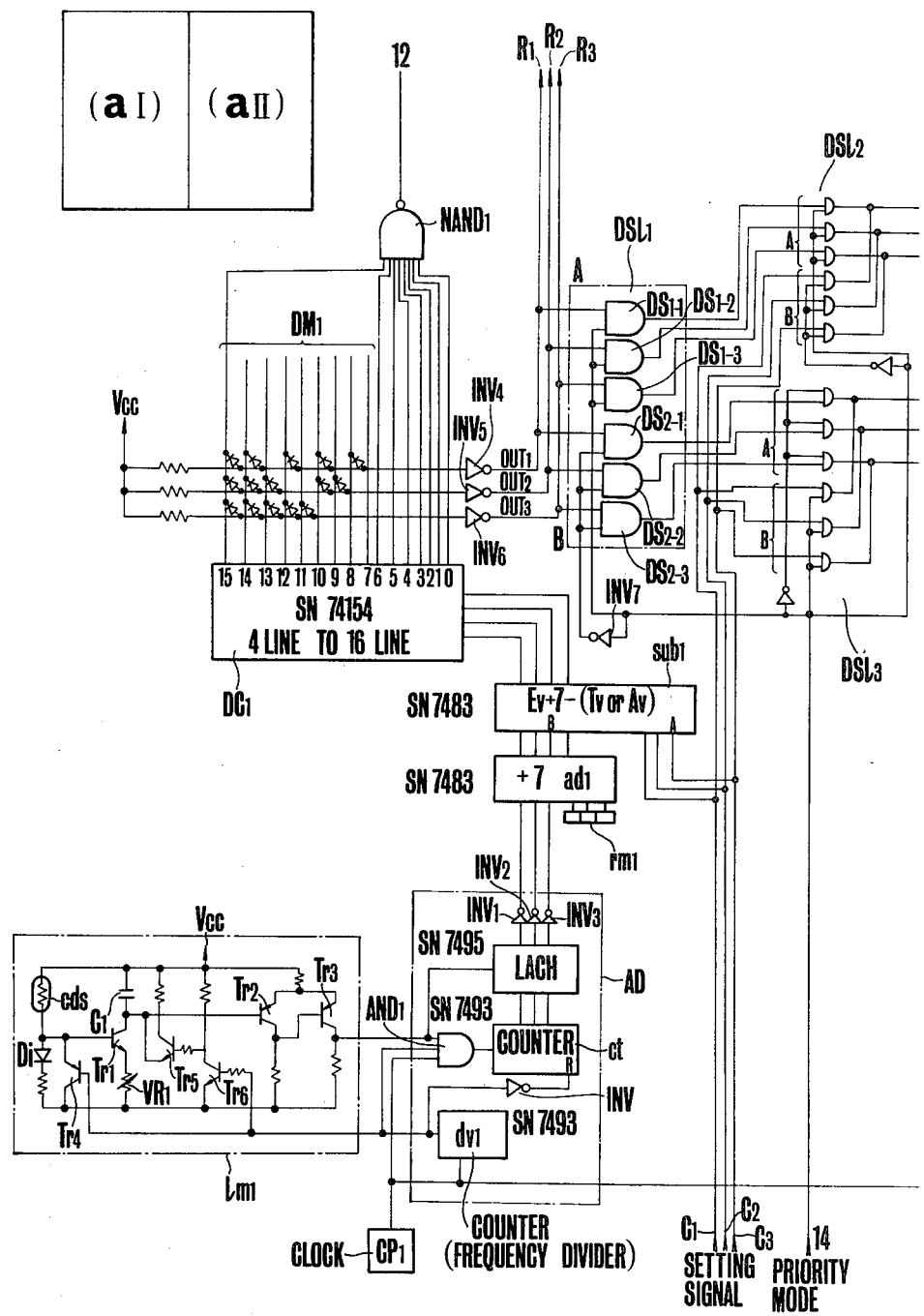
FIG. 5(a) shows a circuit diagram of an embodiment of the exposure operation circuit 3, the light measurement circuit and A-D converter shown in FIG. 1.
FIG. 5(b) shows a table for showing the relation between the input of the diode matrix DM1 shown in FIG. 5(a) and the outputs.
FIG. 5(c) shows a table for showing the relation among the input signals of the DMP1, the outputs through the inverter of DMP1 and the outputs of the diode matrix DM2.
FIG. 5(d) shows a table for showing the relation between the input signals of DMP2 and the outputs of the diode matrix DM3.
FIG. 5(e) shows the composition of the 7-segments for display.
FIG. 5(f) shows wave forms of the outputs at the output terminals Q1-Q6 of the shift register and the output pulses of the pulse generator 7 shown in FIG. 5(a).
FIG. 5(g) the timing chart of the device shown in FIG. 2.
Figure 5:
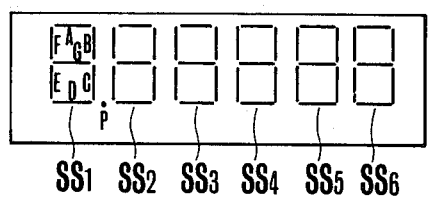
Figure 5:
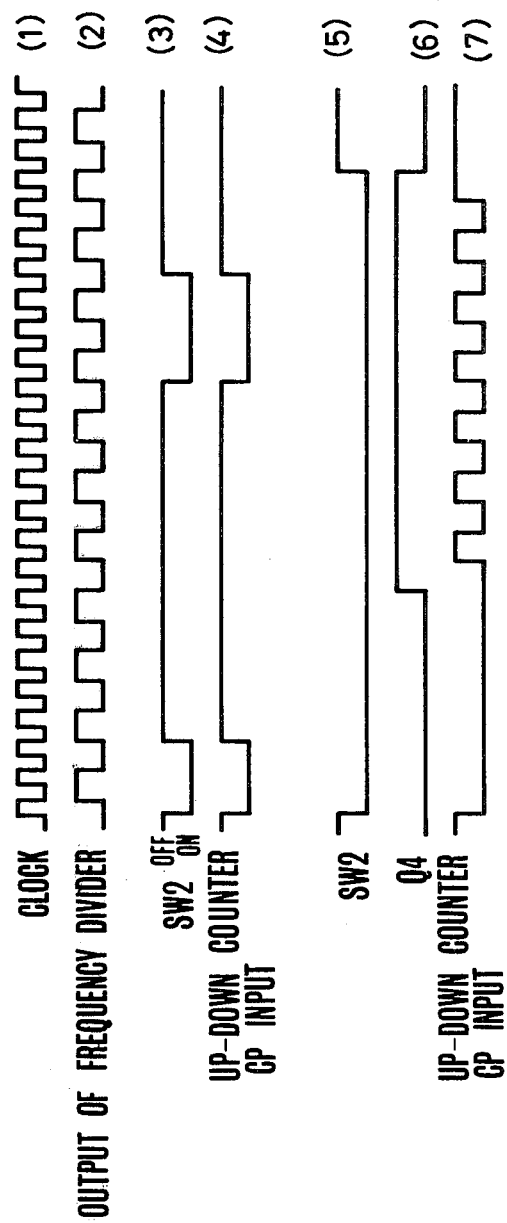
Figure 6:
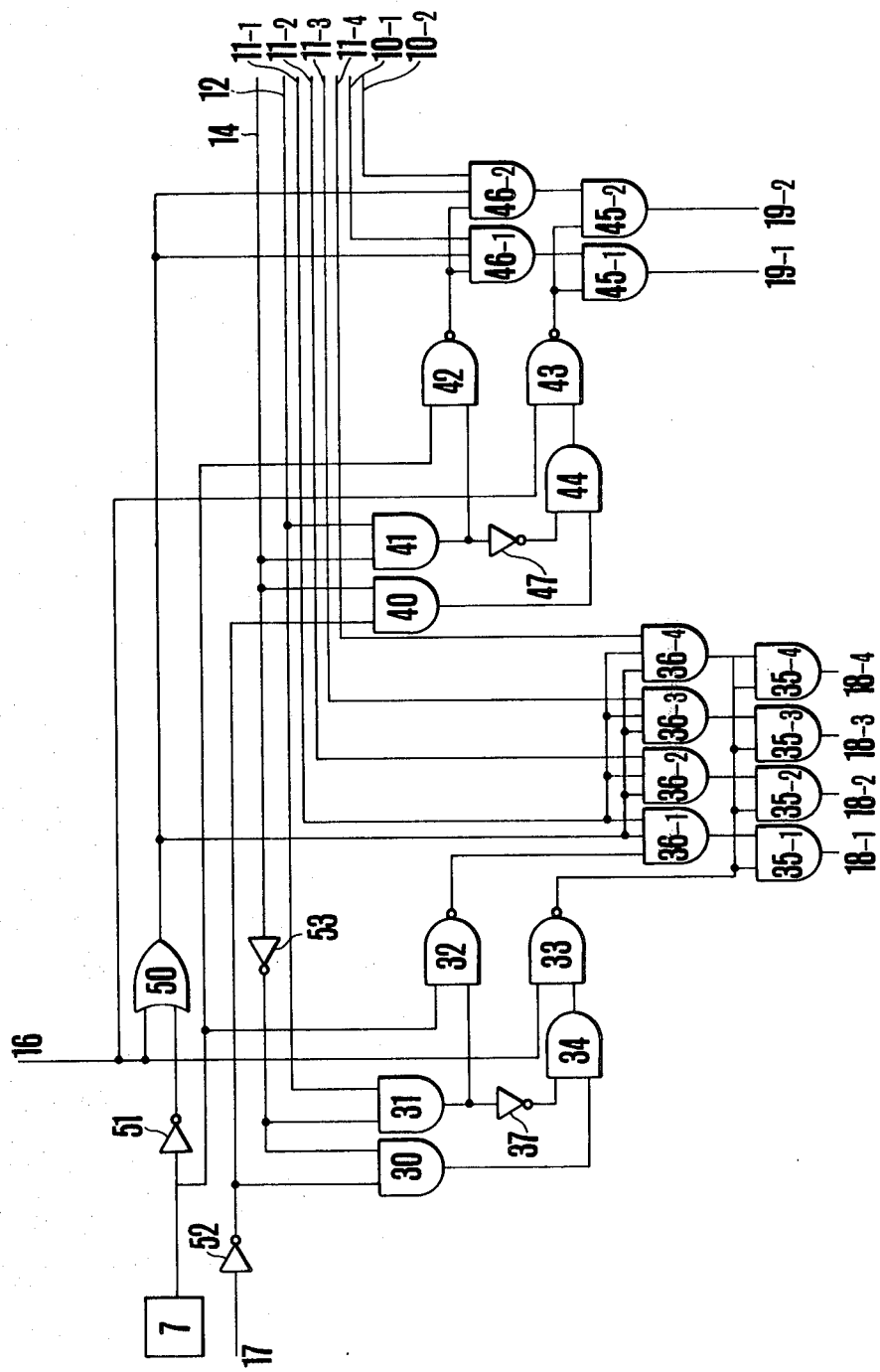
FIG. 6 shows a circuit diagram of an embodiment of the display control device shown in FIG. 1.

FIG. 3 shows a table for showing the relation between the shutter time value and the diaphragm value for digital value used in the present invention. FIG. 5(b) shows a table for showing the relation between the input of the diode matrix DM1 shown in FIG. 5 and the outputs. FIG. 5(c) shows a table for showing the relation among the input signals of the DMP1 of FIG. 5(a), the output through the inverter of DMP1 and the outputs of the diode matrix DM2. FIG. 5 (d) shows a table for showing the relations between the input signal of DMP2 and the outputs of diode matrix DM3. FIG. 5(e) shows the composition of the 7-segments for display. FIG. 6 shows a circuit diagram of an embodiment of the display control device 5 shown in FIG. 1. The circuit consists of the AND gates 30, 31, 34, 35-1–35-4, 36-1–36-4, 40, 41, 44, 45-1, 45-2, 46-1, 46-2, the NAND gates 32, 33, 42, 43, the inverters 37, 47, 51–53 and the OR gates 50, being respectively supplied with the clock pulses from the pulse generators 7, the limit value signal from the line 16, the signal for the information setting operation and the setting operation terminal from the line 17, the priority mode signal from the line 14, the alarm signal from the line 12, the digit signal for the 7-segments for displaying the shutter time produced at the output terminals Q3–Q6 of the shift register shown in FIG. 5(a) from the lines 11-1–11-4 and the digit signal for the 7-segments for displaying the aperture value produced at the output terminals Q1, Q2 of the shift register shown in FIG. 5(a) from the lines 10-1, 10-2, whereby the circuit is so designed that each digit signal is delivered to the lines 18-1–18-4, 19-1–19-2 through the AND gates 35-1–35-4, 45-1, 45-2. Further FIG. 5(f) shows a diagram for showing the relation between the outputs at the outputs terminals Q1–Q6 of the shift register shown in FIG. 5(a) and the output pulses of the pulse generator 7, while FIG. 7 shows a table of the variations of the display mode to each input signal shown in FIG. 6, whereby the mark ○ means a continuous lighting, the mark ☼ means a repeated lighting and the mark ○ means no lighting.

Below the photographic information display circuit of the present invention shown in FIG. 1 will be explained in accordance with FIGS. 2 to 7. The circuit shown in each drawing is supplied with electrical power, the power source switches not shown in the drawings being closed. In this state, the switch Sw2 shown in FIG. 2 is closed, the exposure information setting operation member to be explained later being operated. In this way the low level signal (hereinafter called "0" signal) is applied to the reset terminal Reset of the counter so that the counter 21 becomes ready for counting. As the output terminal Q4 of the counter delivers "0" signal at this time, the high level signal (hereinafter called "1" signal) is applied to the one input terminal of the AND gate 24 through the invertor 27 so that the pulses from the pulse generator 7 are transmitted to the counter through the AND gate 24, whereby the counter starts the pulse counting. When the counter has counted a certain number of the pulses, the output at the output terminal Q4 of the counter changes from "0" signal into "1" signal in such a manner that the AND gate 24 is brought out of the opened state into the closed state whereby the output terminal Q4 continues to deliver "1" signal so far as the switch Sw2 is closed. Consequently, the AND gate 22 is brought into the opened state as soon as the output terminal Q4 delivers "1" signal in such a manner that the pulses obtained from the pulse generator 7 through the frequency divider 23 are transmitted to the OR gate 25 whereby, as explained later, the pulses from the OR gate 25 are transmitted to the up-down counter 2 through the AND gate to whose one input terminal "1" signal is applied normally from the line 16. In this way, one pulse is transmitted to the counter 2 at the time when the switch Sw2 is closed and then after the output terminal Q4 of the counter 21 delivers "1" signal the counter 2 counts the pulses from the frequency divider 23 step by step. As to the content of the counter 2, as is shown in FIG. 3 "0 0 0" corresponds to the shutter time ⅛ sec. the apertures value 2.0, "0 0 1" the shutter time 1/5, the aperture value 2.8 and so on, so that by means of closing the switch Sw2 the shutter time or the aperture value to be set varies successively in such a manner that the set value is determined by the closed time of the switch Sw2. Further, the output of the counter is put in the counter control device (4 in FIG. 1) shown in FIG. 4 through the output terminals C1–C3, whereby the counter control device is so designed as to deliver "0" signal, namely the limit value signal for showing that the set value reaches the upper or the lower limit value to the line 16 through the OR gate 34 only when the content of the counter during the setting is "0 0 0" or "1 1 1", namely when the shutter time is set at ⅛ sec. or 1/1000 sec. and the aperture value at 2.0 or 22, so that within the range of the content of the counter between "0 0 0" to "1 1 1", namely when the set value is within the range in which the exposure can be controlled for the counter control device the above mentioned limit value signal is not produced. In this way, the value is set while the operation for the set value is carried out in the exposure operation circuit (3 in FIG. 1) shown in FIG. 5(a). Below the case a photograph is taken with priority on shutter time, the switch Sw3 being closed, will be explained. The content of the counter 2 indicates the set shutter time as it is shown in FIG. 3, so that the shutter time value Tv which is the output of the counter 2 is put in the input terminal A of the full subtractor sub1 shown in FIG. 5(a). Further the value Ev+7, which is the digit value corresponding to the Ev value as the output of the light measurement circuit lm1 added with the digital value corresponding to 7 in decimal system by means of the full adder ad2 is put in the b input terminal of the adder ad1 at each output of the frequency divider dv1 so that the output of the full subtractor sub1 assumes the value corresponding to Ev+7−Tv. This value is decoded by means of the 4 line to 16 line decoder DC1 so that when the operation result is "0 0 0 0"–"0 1 1 0" and "1 1 1 1", either one output terminal of the output terminals 0–6 and 15 of DC1 delivers "0" signal in such a manner that the NAND gate NAND1 delivers "1" signal as alarm signal for showing that the operated value is outside of the range in which the shutter time or the aperture value can not be controlled. The decoder DC1 delivers as output OUT1–OUT3 through the diode matrix and the inverter in accordance with the output of the full subtractor sub1 as is shown in FIG. 5(e) in such a manner that the output of the decoder DC1 is converted into the 3 bit digital value corresponding to the shutter time value and the aperture value as is shown in FIG. 3, whereby the aperture value Av is transmitted to the one input terminal of the AND gates DS1-1–DS1-3, DS2-1–DS2-3 constituting the data selector DS11. At present the priority is put on the shutter time and therefore the switch Sw3 is closed while "1" signal is on the line 14 so that only the data selectors DS1-1–DS1-3 are in the opened state whereby the aperture value Av is transmitted to the one input terminal A of the data selector DS12. Hereby the set shutter time Tv which is the content of the counter 2 is applied to the other input terminal of the data selector DS12, whereby because the signal on the line 14 is "1" signal only the Av value is produced at the terminal A and applied to the DE-MULTIPLEXER DMP1. On the other hand, Tv value which is the content of the counter 2 is applied to the DEMULTIPLEXER DMP2 through the data selector DS13. By means of DMP1, DMP2 and the diode matrix Tv value and Av value are converted in display segment information as is shown under A-G, P in FIGS. 5(c)(d). Further the ring counter consisting of the NOR gate NOR1 and the shift register SR1 delivers "1" signal to Q1-Q2 one after another in synchronization with the clock pulses from the pulse generator CP1, so as to produce the digit signal 10-1, 10-2, 11-1, 11-3 and 11-4 one after another so that the seven segments SS1-SS6 in FIG. 5(e) are appointed one after another so as to display the aperture value operated by means of the seven segments SS1, SS2 in accordance with the output of DMP1 and the shutter time value set by means of the seven segments SS3-SS6 in accordance with the output of DMP2. In this way, the set shutter time and the operated aperture value are displayed, whereby in case of the present invention the display mode differs in accordance with the factors such as the priority mode, the set value, the operated values and so on so that each display mode will be explained below. When the shutter time is set, the switch Sw2 being closed, "0" signal is on the line 17, while when the priority is put on the shutter time, the switch Sw3 is closed, whereby "1" signal is on the line 14. Further "0" signal is produced only when the set value of the signal on the line 16 is the limit value "0 0 0" and "0" signal as instruction for counting down the content of the counter 2 is on the line or only when the set value is the limit value "1 1 1" and "1" signal as instruction for counting up the content of the counter 2 is on the line 9, while otherwise "1" signal is produced. Consequently, when the priority is put on the shutter time, the shutter time value is under setting while the set value is not the limit value, the line 17 delivers "0" signal, the line 14 "1" and the line 16 "1" signal. Further when at this time, the operated value is within the controlable range as mentioned above the NAND gate NAND1 delivers "0" signal so that the line 12 is on "0" signal. In this state, the AND gates 30, 31 of the display control device (5 in FIG. 1) shown in FIG. 6 are in the closed state, so that the NAND gate 31 delivers "1" signal to the one input terminal of the AND gates 36-1-36-4, while "1" signal on the line 16 is transmitted to the other input terminal through the OR gate 50. In this way, the above mentioned digit signals 11-1, 11-4 are transmitted to the AND gates 36-1-36-4 so that also the AND gates 35-1-35-4 to whose one input terminal the above mentioned digit signals are transmitted delivers the digit signals 11-1-11-4 from the output terminals 18-1-18-4 because at this time the NAND gate 33 delivers "1" signal. The digit signals are transmitted to the display device so that the seven segments SS3-SS6 for displaying the shutter time display the set shutter time in accordance with the above mentioned segment signal. At this time the digit signals 10-1, 10-2 for the seven segments SS1, SS2 for diplaying the aperture value are not transmitted to the segments SS1, SS2, because the AND gate 40 delivers the AND signal of "1" of "1" signal inverted out of the "0" signal on the line 17 by means of the inverter 52 and "1" signal on the line 14, while the AND gate 41 delivers "0" signal in accordance with the "0" signal on the line 12, so that the AND gate 44 delivers "1" signal, while the NAND gate 43 delivers "0" signal.

When the shutter time has been set in the above mentioned state, the shutter time is displayed because the switch Sw2 is opened and therefore only the signal on the line 17 is changed from "0" into "1" while the signals on the other lines remain unchanged so that the line 14 delivers "1", the line 16 "1" and the line 12 "0" in such a manner that the digit signals 11-1-11-4 for the seven segment for displaying the shutter time are transmitted to the AND gate 35-1-35-4 as mentioned above, while as to the digit signals 10-1, 10-2 for the seven segments for displaying the aperture value the AND gate 40 delivers "0" signal and therefore the AND gate 44 also delivers "0" signal whereby the NAND gate 43 delivers "1" signal while "1" signal from the NAND gate "42", "1" signal from the line 16 and the digit signals 10-1, 10-2 are applied to the input terminal of the AND gates 46-1, 46-2 in such a manner that the signals at the input terminal of the AND gates 45-1, 45-2 are "1" signal of the NAND gate 43 and the digit signals 10-1, 10-2 produced through the AND gates 46-1 and 46-2 which digit signals are transmitted to the display circuit through the output terminal 19-1 and 19-2 so as to display the shutter time as well as the aperture value by means of the seven segment.

Further, when the priority is put on the shutter time, the shutter information is under setting, the operated value is within the controlable range and the set value has reached the limit value, the line 14 delivers "1" signal, the line 17 "0" signal, the line 12 "0" signal and the line 16 "0" signal so that "0" signal inverted by means of the inverter 5, of "1" signal from the line 14 is applied to the one input terminal of the AND gates 30, 31 which gates produce "0" signals in such a manner that the NAND gate 32 produces "1" signal. Further, the pulses of the pulse generator 7 are transmitted to the OR gate 50 so that the AND gates 36-1-36-4 allow the passage of the digit signals 11-1-11-4 at the frequency of the pulse generator 7. Further because the line 16 is on "0" signal, the NAND gate 33 delivers "1" signal, whereby the AND gates 35-1-35-4 to whose one input terminal the digit signals 11-1-11-4 are applied through the AND gates 36-1-36-4 at the frequency of the pulse generator 7 also allow the passage of the digit signals 11-1-11-4 at the above mentioned frequency in such a manner that the seven segments SS3-SS6 for displaying the shutter time carry out the repeated lighting so as to display the shutter time. Namely as is shown in FIG. 5(f), the oscillation frequency of the pulse generator 7 is chosen longer than that of the pulse generator CP1 in FIG. 5(a) for controlling the frequency of the digit signals so that as mentioned above the shutter time is displayed by the lighting repeated at the frequency of the pulse generator 7. Further at this time, the digit signal 10-1, 10-2 for the seven segment for displaying the aperture value are transmitted to the one input terminal of the AND gates 45-1, 45-2 at the frequency of the pulse generator 7, because the line 14 is on "1" signal and the line 12 is on "0" signal so that the AND gate 41 delivers "0" signal while the NAND gate 42 delivers "1" signal which signal is transmitted to the one input terminal of the AND gates 46-1, 46-2 to whose other input terminal the pulses of the pulse generator are applied through the inverter 51 and the OR gate 50 in such a manner that the gates 46-1 and 46-2 open and close at the frequency of the pulse generator 7. Further at this time, the AND gate 40 produces "1" signal while the AND gate 41 produces "0" signal so that to the AND gate 44 the output of the gate 40 and the output of the gate 41 through the inverter 47 are applied whereby the gate 44 produces "1" signal while the line 16 is on "0" signal so that the NAND gate 43 produces "1" signal in such a manner that the AND gates 45-1 and 45-2 open and close at the frequency of the pulse generator 7, in the same way as in case of the digit signal for the seven segments for displaying the shutter time, so as to produce the digit signals 10-1 and 10-2 so that the aperture value is also displayed by the repeated lighting.

When the shutter time has been set, the priority is put on the shutter time, the set value is within the controlable range and the operation result is out of the controlable range, the line 17 delivers "1" signal, the line "1" signal, the line 16 "1" signal and the line 14 "1" signal so that the AND gates 30 and 31 deliver the "0" signal because "1" signal is applied to the gates 30 and 31 from the line 14 through the inverter 5, whereby the NAND gate 32 delivers "1" signal while the OR gate 50 delivers "1" signal by means of "1" signal from the line 16 in such a mannner that the outputs of the AND gates 36-1-36-4 correspond to the digit signals 11-1-11-4 which are transmitted to the one input terminal of the AND gates 35-1-35-4. At this time, the AND gate 34 delivers "0" signal while the NAND gate 33 delivers "1" signal so that the AND gates 35-1-35-4 allow the passage of the digit signal 11-1-11-4 so as to display the shutter time. Further at this time, the AND gates 46-1 and 46-2 deliver the digit signal 10-1, 10-2 for the seven segments for displaying the aperture value at the frequency of the pulse generator 7, because the lines 12 and 14 are on "1" signal and therefore the AND gate 41 delivers "1" signal whereby the NAND gate 42 repeats "1" signal and "0" signal at the frequency of the pulse generator 7 while the OR gate 50 delivers "1" signal. Further the AND gates 44 delivers "0" signal so that the NAND gate 43 delivers "1" signal in such a manner that the AND gates 45-1 and 45-2 deliver the digit signal 10-1 and 10-2 at the frequency of the pulse generator so as to display the aperture value by the repeated lighting. After that display mode is determined in accordance with the state of the signal on each line in the same way as mentioned above. Below the display mode will be explained in accordance with the theoretical formula of the circuit shown in FIG. 6 for the sake of simplicity.

Now let the signal on the line 16 be A, that on the line 17 B, that on the line 14 C, that on the line 12 D, that of the pulse generator E, the digit signals 11-1-11-4 F1-F4 and 10-1-10-2, G1, G2. The output of the AND gate 35-1 is represented by $$\{(A+\overline{E})\cdot\overline{(C\cdot D)}\cdot E\cdot F1\}\cdot\overline{\{(B\cdot C\cdot\overline{C}\cdot D)\cdot A\}} \quad (1)$$

The output of the AND gate 35-2 is represented by replacing F1 in (1) with F2. The output of the AND gate 35-3 is represented by replacing F1 in (1) with F3. The output of the AND gate 35-4 is represented by replacing F1 in (1) with F4. Further the output of the AND gate 45-1 is represented by $$\overline{\{\overline{(C\cdot D)}\cdot E\cdot(A+\overline{E})\cdot G1\}\cdot\{C\cdot D\cdot(C\cdot\overline{B})\}\cdot A} \quad (2)$$

The output of the AND gate 45-2 is represented by replacing G1 in (2) with G2.

When the priority is put on the shutter time, the line 14 is on the "1" signal, namely C=1, the shutter information is under setting, the line 17 is on "0" signal, namely B=0, the set value is within the controlable range, the line 16 is on "1" signal, namely SA=1, the operated value is out of the controlable range and the line 12 is "1" signal, namely D=1, the output of the AND gate 35-1 is represented as follows in accordance with (1)

$$(1\cdot\overline{0}\cdot\overline{E}\cdot F1)\cdot\overline{0\cdot 1}=F1$$

namely the digit signal 11-1 is produced. Further the outputs of the AND gates 35-2-35-4 are F2-F4 in a similar way so that the digit signal 11-1-11-4 are produced so as to display the shutter time. Further the output of the AND gate 54-1 is represented as follows in accordance with (2).

$$\overline{(1\cdot E\cdot 1\cdot G1)}\cdot\overline{0\cdot 1}=\overline{E}\cdot G1$$

whereby G1 is in the state of E, namely the digit signal 10-1 is produced at the frequency of the pulse generator. Further the output of the gate 45-2 is also E. G2 so that the digit signals 10-1 and 10-2 are produced at the frequency of the pulse generator 7 so as to display the aperture value by the repeated lighting. Further when the priority is put on the shutter time, C=1, the shutter information is under setting. B=0, the set value has reached the limit value, A=0, the operated value is out of the controlable range and D=1, the outputs of the gates 35-1-35-4 are represented by $\overline{E}\cdot F1, \overline{E}\cdot F2, \overline{E}\cdot F3, \overline{E}\cdot F4$ in accordance with (1) so that the shutter speed is displayed by the lighting repeated at the frequency of the pulse generator 7. Further the outputs of the gates 45-1 and 45-2 are represented $\overline{E}\cdot\overline{E}\cdot G1=\overline{E}\cdot G1$ and $\overline{E}\cdot\overline{E}\cdot G2=\overline{E}\cdot G2$ in accordance with (2) so that the aperture value also are displayed by the lighting repeated at the frequency of the generator 7. In the above mentioned case the priority is put on the shutter speed, while in case the priority is put on the aperture value the same display as in case of priority on shutter speed is carried out. Namely, when the priority is put on the aperture value (C=0), the aperture information is under setting (B=0), the seat value has not reached the limit value (A=1) and the operated value is within the controlable range (D=0), in accordance with (1)

$$\{(A+\overline{E})\cdot O\cdot F1\}\cdot\overline{\{\overline{(B\cdot C\cdot\overline{C}\cdot D)}\cdot A\}}=0$$

so that the seven segments for the shutter time does not light up while in accordance with (2)

$$\overline{(1\cdot 1\cdot G1)\cdot\overline{(1\cdot 0\cdot 1)}}=G1$$

so that the aperture information is displayed by lighting. Further when the priority is put on the aperture value (C=0), the aperture information is under setting (B=0), the set value has reached the limit value (A=0) and the operated value is within the controllable range (D=0) the formula (1) gives $\overline{E}\cdot F1$ so that the shutter time is display by the lighting repeated at the frequency of the pulse generator 7 while the formula (2) give $\overline{E}\cdot G1$ so that the aperture value is displayed also by the lighting repeated at the frequency of the pulse generator 7. Further when the priority is put on the aperture value (C=0), the aperture value has been set (B=1), the set value is not the limit value (A=1) and the operated value is out of the controlable range (D=1), in accordance with (1) 1·$\overline{E}$·F1=$\overline{E}$·F1 so that the shutter time is displayed by the lighting repeated at the frequency of the pulse generator 7 while the formula (2) gives G1 so that the aperture value is displayed by the lighting. Further when the priority is put on the aperture value (C=0), the aperture information is under setting (B=0), the set value has not reached the limit value (A=1) and the operated value is out of the controlable range (D=1), in accordance with D·$\overline{E}$·$\overline{E}$·F1=$\overline{E}$·F1 so that the shutter time is displayed by the lighting repeated at the frequency of the pulse generator 7, while the formula (2) gives G1 so that the aperture value is displayed by the lighting. Further when the priority is put on the aperture value (C=0), the aperture information is under setting (B=0), the set value is the limit value (A=0) and the operated value is out of the controlable range (D=1), in accordance with (1) $\overline{E}$·$\overline{E}$·F1=$\overline{E}$·F1 so that the shutter time is displayed by the lighting repeated at the frequency of the pulse generator 7 while the formula (2) gives $\overline{E}$·G1 so that the aperture value is displayed also by the lighting repeated at the frequency of the pulse generator 7.

As explained above, the display mode of the set value and the operated value is determined, as is shown in the table in FIG. 7 by means of the signal of each line, whereby it is possible for the photographer to judge with correctness whether the set value and the operated value have reach the limit value or within the controlable range.

Further, when the line 16 is on "0" signal in the present embodiment, namely when the information is under setting and the content of the counter 2 is "0 0 0" while the pulses are counted down (the set value reaches the lower limit value), the AND gate 26 in FIG. 2 is brought in the closed state in such a manner that the pulse counting is interrupted so that the content of the counter 2 is not altered any more.

When with the exception of the AND gate 26 in FIG. 2 in the embodiments shown in FIGS. 2 to 7 the output of the OR gate 25 is directly connected to the terminal CP of the counter 2, the content of the counter becomes the limit value for the set value at the other side by means of the next input pulse when the content of the counter reaches the limit value for the set value and the counting is resumed from this state.

Figure 8:
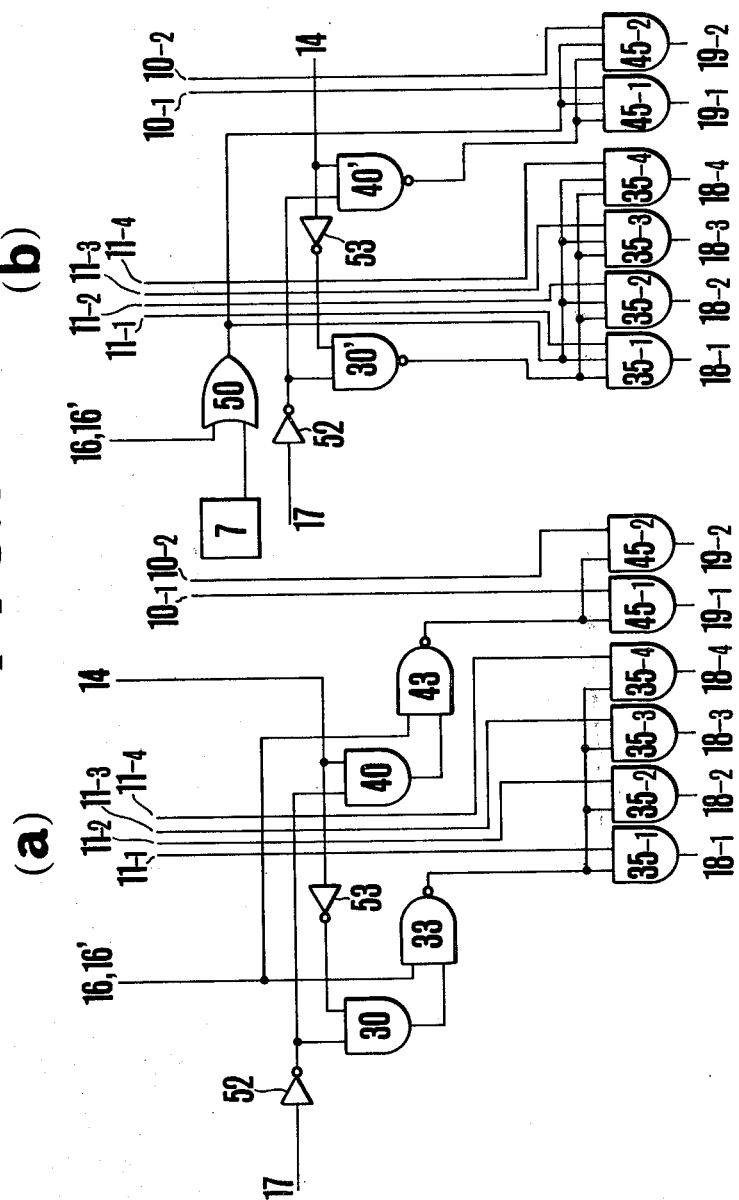
FIGS. 8(a) and (b) respectively shows a circuit diagram of another embodiment of the display control device shown in FIG. 6.

FIG. 8(a) and (b) respectively show an embodiment of the logical circuit for certain specified operation of the display control device shown in FIG. 6, whereby FIG. 8(a) refers to the case different from the embodiment shown in FIG. 5 the limit value for the set value and the operated value are display by the continuous lighting when the set value as display control output reaches a limit value for the set value, while FIG. 8(b) refers to the case the set value is displayed by the repeated lighting of the seven segments when the set value reaches the limit value during the setting.

In FIG. 6, the signal on the line for alarming that the set value reaches the limit value becomes "0", the NAND gates 33 and 43 produce "1" signal so as to hold the AND gates 35-1-35-4, 45-1-45-2 in the opened state in such a manner that the digit signals 10-1, 10-2, 11-1-11-4 are transmitted to the display device as they are. In other words in case of the above mentioned circuit composition the limit value for the set value and the operated value are display by the continuous lighting.

In FIG. 8(b), the line 16 is on "0" signal while the line 17 is on "1" signal through the inverter 52 when the switch Sw2 is closed and the set value reaches the limit value while the information is under setting whereby the opening and the closing signal are supplied with to the line 16 from the clock signal generator 7 through the OR gate so that when the line 14 is on "1" signal, namely the priority is put on the shutter time, the outputs of the AND gates 35-1-35-4 are switched on and off at the frequency of the generator 7 in such a manner that the digit informations 11-1-11-4 for the seven segments for displaying the shutter time are transmitted to the display device so as to display the set value by the repeated lighting while the operated value for the aperture value is not displayed because the AND gates 45-1 and 45-2 are closed.

Figure 9:
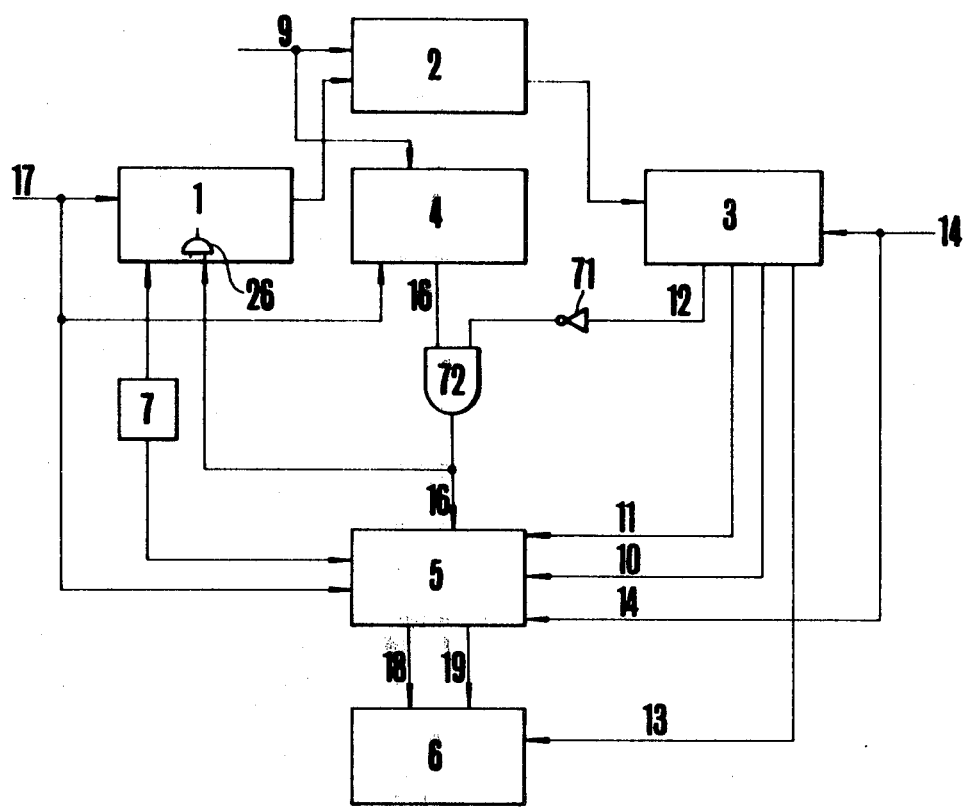
FIG. 9 shows a block diagram of another embodiment of the photographic information setting display circuit in accordance with the present invention.

FIG. 9 shows a block diagram of another embodiment of the photographic information setting display circuit in accordance with the present invention, whereby the same elements as those in FIG. 1 presents the same figures and the input circuits, the switches and so on are omitted.

The embodiment is different from that shown in FIG. 1 in the fact that the alarm signal 12 given when the operated value from the exposure operation circuit 3 surpasses the controlable range is transmitted to the display control device 5 and the clock input control device 1 through the inverter 71 and the AND gate 72. Below the case the circuit shown in FIG. 8(a) is used as the display control device 5 shown in FIG. 9. When the operated value is out of the controlable range, the output of the NAND gate shown in FIG. 5 becomes "1" signal and the line 12 is on "1" signal to be transmitted to the AND gate 72 through the inverter 71, the line 16' is on "0" signal whereby the value set with priority and the operated value are displayed at the same time, while the AND gate 26 of the clock input control device 1 is brought into the closed state, interrupting further change of the set value so as to prevent the operated value from escaping from the controlable range. Below the case the circuit shown in FIg. 8(b) is used as the display control device 5. When the operated value is out of the controlable range, the line 16' is on "0" signal, whereby the pulses are transmitted to the AND gate 35-1-35-4 and 45-1-45-4 from the pulse generator 7 through the OR gate 50 so that both the shutter time and the aperture value are displayed by the repaeated lighting when the setting has been completed. Hereby the present embodiment is different from that shown in FIG. 1 only in the above mentioned point, while other circuit composition are same as those explained in accordance with FIGS. 2 to 7, their operation being also same so that their explanation will be omitted.

Figure 10:
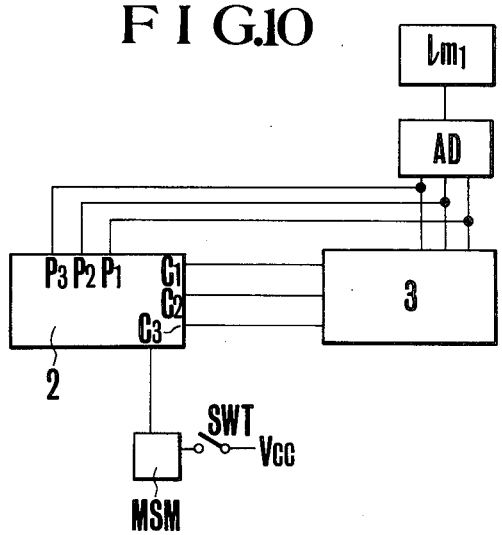
FIG. 10 shows a circuit diagram of another embodiment of the circuit for setting information at the counter 2 shown in FIG. 1.

FIG. 10 shows a block diagram of the circuit composition by means of which the content of the counter 2 shown in FIG. 1 is made directly the digital value from the light measuring circuit 5 when the power source switch is closed. This circuit composition is so designed that the output of the A-D converter shown in FIG. 5(a) is connected to the parallel input terminals P1-P3 of the counter 2 while the monostable multivibrator MSM is operated by means of closing the power source switch SWT, whereby the output terminal of the multivibrator is connected to the parallel presettable input terminal of the counter 2 in such a manner that the output of the A-D converter is put in the counter 2 when the power source switch is closed. Hereby it is necessary to choose the inversing frequency of the multivibrator longer than the A-D converting time.

Figure 11:
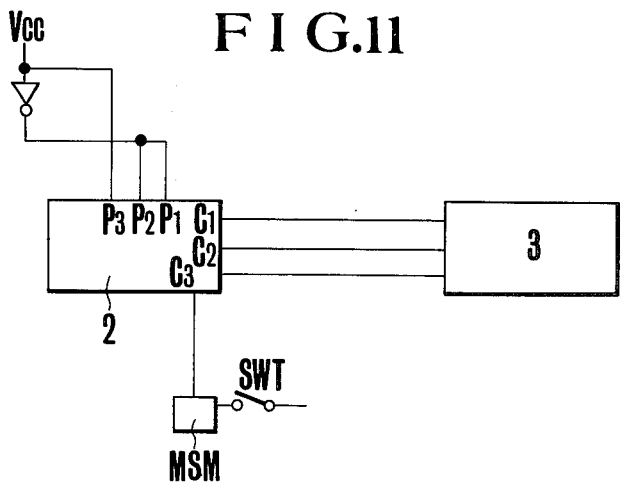
FIG. 11 shows a circuit diagram of further another embodiment of the circuit for setting informations at the counters 2 shown in FIG. 1.

FIG. 11 shows a circuit diagram of the circuit composition by means of which the content of the counter in the embodiment shown in FIG. 1 is set "1 0 0" when the power source switch is closed. When the power source switch SWT is closed, the output of the monostable multivibrator MSM is applied to the parallel presettable input terminal of the counter 2, "1" is applied to the input terminal P3 while "0" is applied to the input terminals P3 and P1 in such a manner that the content of the counter 2 is automatically set at "1 0 0", whereby in case the priority is put on the shutter time the shutter time is set at 1/125 sec. as is clear from the table of FIG. 3(e) while in case the priority is put on the aperture value the aperture value is set at F8.0 so as to set at the counter 2 the shutter time or the aperture value which is used most frequently and at the same time the approprimate mean value within the controlable range in such a manner that it is convenient for the alteration of the set value.

Figure 12:
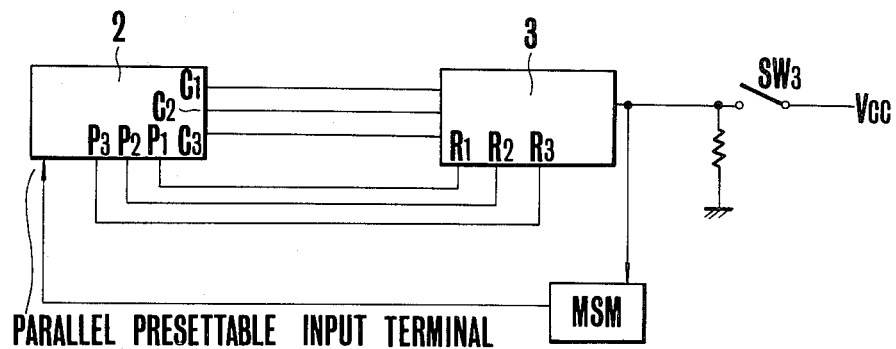
FIG. 12 shows a circuit diagram of further another embodiment of the circuit for setting informations at the counters 2 shown in FIG. 1.

FIG. 12 shows a circuit diagram of an embodiment in which a certain determined value is preset at the counter 2 in FIG. 1 at the time of changing over the priority mode. In this circuit the output R3-R1 of the exposure operation circuit are respectively transmitted to the preset input P3-P1 of the up-down counter 2 while a signal is applied to the parallel presetable input terminal of the counter 2 from the priority changing over signal circuit through the monostable multivibrator MSM. By means of this circuit, the value operated by the operation circuit out of the value for example manually set at the counter 2 in advance is transmitted to the preset input terminals P3-P1 of the counter from the output terminals R3-R1 at the termination of the operation by the priority mode change over operation (by means of SW3) in such a manner that the set value of the counter 2 is replaced with the operated value from the operation circuit at the time of the priority mode change over. Namely when it is desired to take the next photograph with priority on the aperture value obtained from the light measuring circuit or the like when a photograph has been taken with priority on shutter time, the previously obtained aperture value is automatically set at the counter by simply operating the priority change over switch SW3 so that a quick priority mode change over is carried out.

Figure 13:
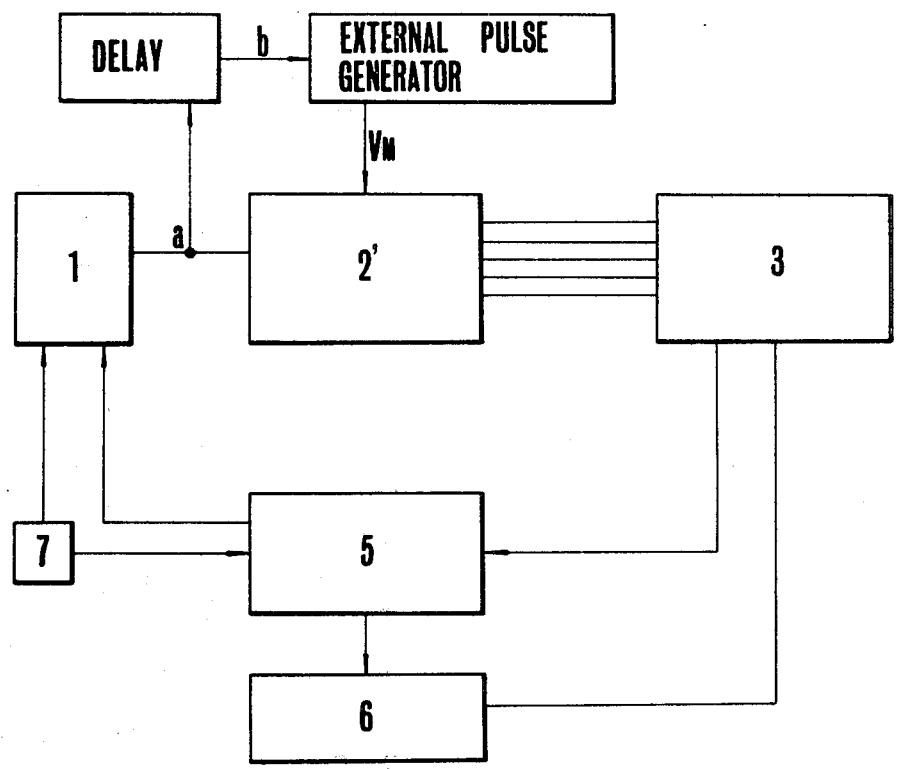
FIG. 13 shows a circuit diagram of further another embodiment of the photographic information setting display circuit in accordance with the present invention.

FIG. 13 shows a block circuit diagram of an embodiment of the circuit in accordance with the present invention. In this embodiment a nonvolatile memory is made use of as the counter memory of the device, as the nonvolatile memory the recently developed MNOS is used. In the drawing, 2' is the nonvolatile counter memory consisting of MNOS, the clock signal for which memory is delivered to the line a from the clock input control device 1. This input clock drives the external pulse generator through a delay circuit so as to carry out the counting. By making use of MNOS as nonvolatile memory, the counted value of the counter is stored in the memory transister even of the power source switch is opened. Other circuit composition as well as their operations are same as those of the circuit shown in FIG. 1 so that their explanations are omitted here.

Figure 14:
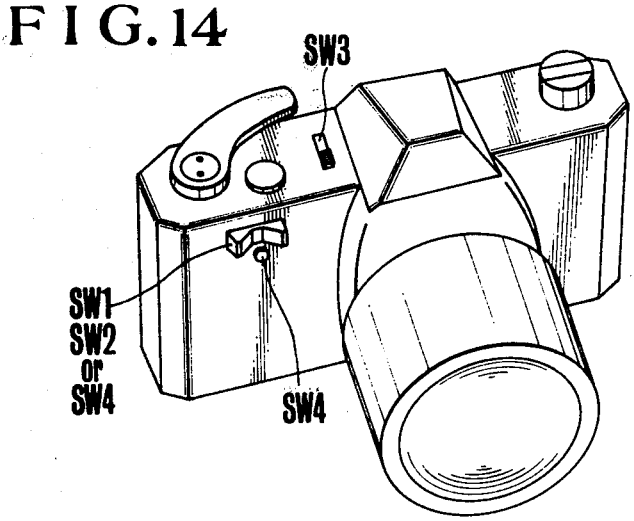
FIG. 14 shows in perspective view an embodiment of a camera in which the photographic information setting display circuit in accordance with the present invention is applied.

FIG. 14 shows an appearance of an embodiment of the camera in which the photographic information setting display circuit in accordance with the present invention, in perspective view, whereby it is desirable to dispose the operation switches SW1 to SW4 in FIG. 1 on the upper or the front side of the camera body as is shown in the drawing so as to facilitate the photographing.

Figure 15:
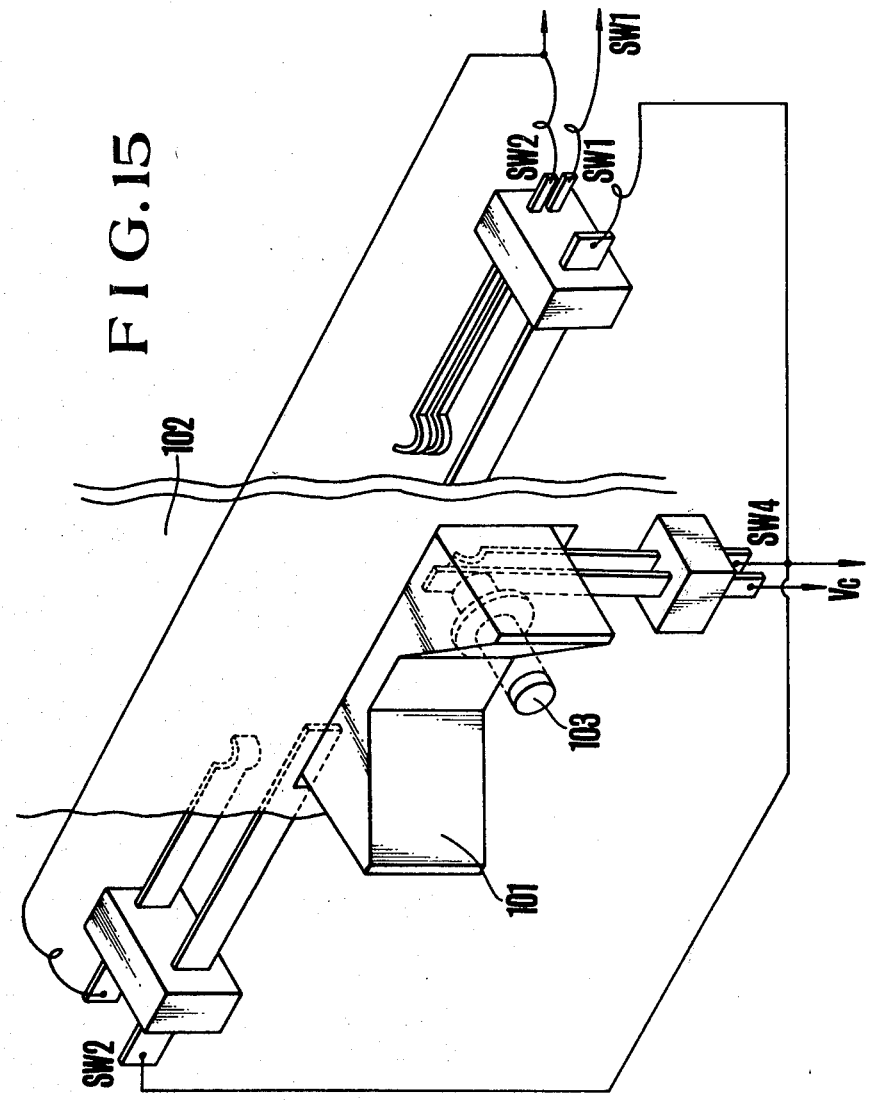
FIG. 15 shows an embodiment of the composition between the operation bottons provided on the camera body and the switches provided in the body.
Figure 16:
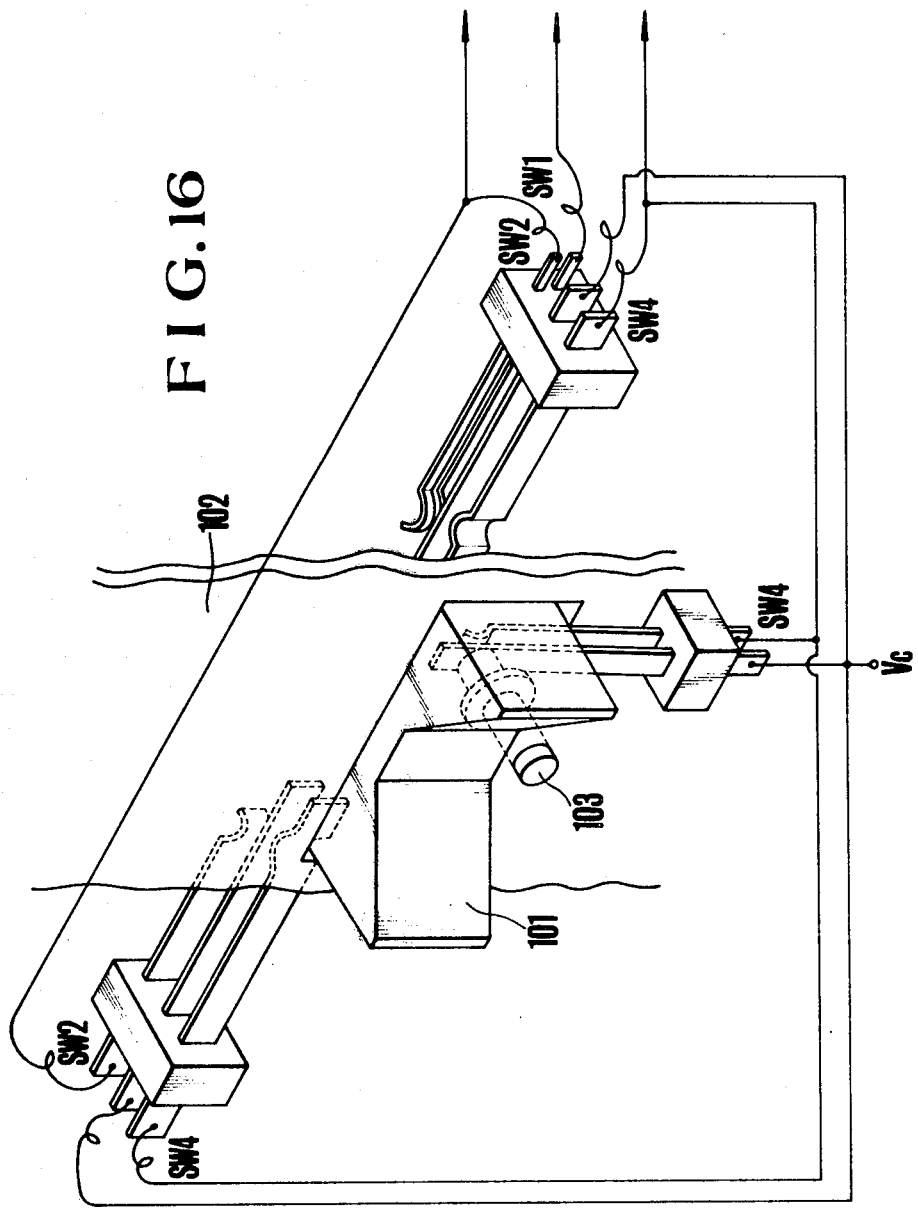
FIG. 16 shows another embodiment of the composition shown in FIG. 15.

FIGS. 15 and 16 respectively show an embodiment of the composition of the operation button (or lever) provided on the camera body and the switches in the camera body, of the circuit in accordance with the present invention in perspective view. In the drawing, 101 is the operation button for information setting, being rotatably born on the switch board 102 by means of a mechanism not shown in the drawing.

SW1 and SW2 are respectively the up-down direction instruction switch and the clock input control switch shown in FIG. 1. The up step operation or the down step operation for information setting is carried out by pushing the right projection or the left projection of the button 101. 103 is the push button for operating the display control switch SW4. In case of the disposition shown in FIG. 16, this display control switch SW4 is operated both by means of the button 103 and of the setting button 101, whereby by the first stroke of the button 101 the display switch SW4 is closed while by the second stroke the switches SW1 and SW2 are closed.

As explained above, in case of the photographic information setting display circuit, by means of the operation means such as push buttons provided at convenient positions on a camera the setting information is changed in a way of step and display by the display device together with the operated value from the operation means, whereby the photographic priority mode and the setting operation as well as the alarm in case the value is out of the controlable range can also be displayed in a proper way so that it can be said that the present invention is very profitable for digitally controlled camera.

What is claimed is:

1. A photographic information display circuit for displaying photographic information comprising:
    (a) pulse forming means for producing pulses,
    (b) counter means for counting the pulses from the pulse forming means,
    (c) manually operable exposure controlling operation means coupling the pulse forming means to the counter means for forming count control signal and for making the counter means count the pulses from the pulse forming means until an exposure value is set in the counter in response to the count control signals,
    (d) a light measuring circuit for producing a digital value corresponding to the intensity of the light from the object,
    (e) an operation circuit connected to the counter means and the light measuring circuit so as to produce a digital calculated exposure value on the basis of the object brightness and the exposure value set at the counter means,
    (f) first display means connected to the counter means so as to display the exposure value in the counter means,
    (g) second display means connected to the operating circuit so as to display the calculated exposure value produced by the operating circuit, and
    (h) a display control circuit coupled to the operation means for transmitting display control signal to the first display means in response to the count control signal so as to display the set exposure value by means of the first display means and for transmitting the display control signal to the second display means so as to display the set value and the calculated exposure value when the count control signal disappears.

2. A photographic information display circuit in accordance with claim 1, wherein the display control circuit further includes;
   a first gate circuit connected to the first display means for transmitting the content of the counter means to the first display means, and
   a second gate circuit coupled to the second display means for delivering the output signal of the operation means to the second display means in response to cessation of the count control signal.

3. A photographic information display circuit in accordance with claim 1, wherein a set value detecting circuit connected to the counter means delivers a limit value signal when the output of the counter means reaches a predetermined digital value and said second display means displays the calculated exposure value when said limit value signal appears.

4. A photographic information display circuit in accordance with claim 3, wherein the counter means interrupts the input of the pulses from the pulse forming means in response to the limit value signal.

5. A photographic information display circuit in accordance with claim 3, wherein the display control circuit includes a pulse generating means and a gate circuit which is opened in response to the limit value signal of the set value so as to deliver the display control signal at the frequency of the pulse generating means in such a manner that the limit value of the set value is flashed when the limit value signal is delivered.

6. A photographic information display circuit in accordance with claim 1, wherein a calculated value detecting circuit connected to the output terminal of the operation circuit delivers an alarm signal when the output of the operation circuit reaches a given digital value, said second display means displaying the calculated exposure value when the alarm signal appears.

7. A photographic information display circuit in accordance with claim 6, wherein the counter means interrupts the input of the pulses from the pulse forming means in response to the alarm signal.

8. A photographic information display circuit in accordance with claim 6, wherein the display control circuit includes pulse generating means and the display control signal is delivered at the frequency of the pulse generating means in response to the alarm signal so as to flash the calculated exposure value at the frequency of the pulse generating means when the alarm signal is delivered.

9. A photographic information display circuit in accordance with claim 1, wherein the counter means includes a preset input terminal connected to the light measuring circuit and a presettable control signal input terminal for entering the digital value at the preset terminal of the counter means, and a power source switch coupled to a source of power, signal forming means coupled to the power source switch and the presettable control signal input terminal so that the content of the counter means assumes a value corresponding to the object brightness when the power source switch is closed.

10. A photographic information display circuit in accordance with claim 1, wherein the counter means includes preset input terminals and a presettable control signal input terminal for entering a digital value applied to the preset input terminals, and further comprising digital signal forming means connected to the preset input terminal of the counter and delivering a given digital value, a power source switch coupled to a source of power, a signal forming circuit for producing an output when the power source switch is closed and connected to the presettable control signal input terminal to set the content of the counter means at the determined digital value when the power source switch is closed.

11. A photographic information display circuit in accordance with claim 1, wherein the counter means includes a preset input terminal connected to the operation circuit and a presettable control signal input terminal for entering a digital value at the preset input terminals, and further comprising mode selector means for changing the photographic mode and a control signal forming circuit coupled the mode selector means and the presettable control signal input terminal for delivering a control signal to the input terminal so as to enter the output of the operation circuit in the counter means when the mode is changed by the selector means.

12. A photographic information display circuit for displaying the photographic informations comprising;
   (a) pulse forming means for producing pulses;
   (b) counter means for counting the pulses from the pulse forming means,
   (c) gate means connected between the pulse forming means and the counter means,
   (d) manually operated switch means for forming a count signal to make the counter means count the pulses from the pulse forming means, the gate means being opened in response to the count signal so as to transmit the pulses to the counter means,
   (e) a light measuring circuit for producing a digital value corresponding to the intensity of the light from the object,
   (f) a computation circuit connected to the counter means and the light measuring circuit and responsive to the content of the counter means and the digital values of the light measuring means and to compute digital values corresponding to the object brightness and the value set at the counter means,
   (g) first decoder means connected to the counter means for decoding the content stored in the counter means,
   (h) second decoder means connected to the computation circuit for decoding the digital output values of the computation circuit,
   (i) first indicating means connected to the first decoder means for indicating values corresponding to the content stored in the counter means,
   (j) second indicating means connected to the second decoder means for indicating the values corresponding to the digital output values of the operation circuit,
   (k) a display control signal forming circuit, said circuit forming a display control signal for making the first and the second display means display the values,
   (l) a display control circuit connected to the display control signal forming circuit as well as the first and the second display means to interrupt the transmission of the display control signal to the second display means in response to the count signal.

13. A photographic information display circuit in accordance with claim 12, wherein the counter means is a memory consisting of nonvolatile materials.

14. A photographic information display circuit in accordance with claim 12, wherein the pulse forming means includes means coupled to said manually operated switch means for producing one pulse when the manually operated switch means is operated for a predetermined time.

15. A photographic information display circuit in accordance with claim 14, further including clock pulse producing means for producing clock pulses after one pulse has been produced by the pulse producing means.

16. A photographic information display circuit in accordance with claim 12 further comprising:
   a change over means for switching the photographic priority mode,
   a change over connecting circuit coupled to the change over means for connecting the first decoder means to the computation circuit and the second decoder means to the counter means.

17. A photographic information display circuit for displaying the photographic information comprising:
   (a) pulse forming means for producing pulses,
   (b) counter means for counting the pulses from the pulse forming means,
   (c) gate means connected between the pulse forming means and the counter means,
   (d) manually operated switch means forming a count signal for causing the counter means to count the pulses from the pulse forming means, the gate means being opened in response to the count signal so as to transmit the pulses to the counter means,
   (e) a light measuring circuit for producing a digital value corresponding to the intensity of the light from the object,
   (f) a computation circuit connected to the counter means and the light measuring circuit and responsive to the content stored in the counter means and the digital values of the light measuring means to compute the digital values corresponding to the object brightness and the value set at the counter means,
   (g) first decoder means connected to the counter means for decoding the content stored in the counter means,
   (h) second decoder means connected to the computation circuit for decoding the digital output values of the operation circuit,
   (i) a first indicating means connected to the first decoder means for indicating values corresponding to the content stored in the counter means,
   (j) a second indicating means connected to the second decoder means for indicating the value corresponding to the digital output values of the computing circuit,
   (k) a display control signal forming circuit, said circuit forming a display control signal for making the first and the second display means display the values,
   (l) a display control circuit, said circuit including a gate circuit having an output terminal connected to the second indicating means and an input terminal connected the display control signal forming circuit, said gate circuit being closed by means of the count signal so as to interrupt the transmission of the display control signal to the second indicating means.

18. A photographic information display circuit for displaying the photographic information comprising:
   (a) a pulse forming means for producing pulses,
   (b) a counter means for counting the pulses from the pulse forming means,
   (c) manually operated switch means coupled to the counter means for producing a data setting signal and causing said counter means to count the pulses from the pulse when the switch means is operated manually,
   (d) a light measuring circuit for producing a digital value corresponding to the intensity of the light from the object,
   (e) a computation circuit for utilizing the output of the light measuring circuit and that of the counter means values corresponding to the object brightness and the output of the counter, and
   (f) a display circuit to display the information corresponding to the content stored in the counter means when the counter means counts pulses in response to operation of the switch means and to display the information at least corresponding to the output of the computation circuit, when the counter means has completed the counting operation of the pulses.

19. A device for manually setting photographic information for displaying the photographic information comprising:
   (a) pulse forming means for producing pulses,
   (b) a manually operated switch means for setting the information, the switch means being arranged to produce an information setting signal when the switch means is operated,
   (c) counter means for counting the pulses from said pulse forming means in response to said information setting signal,
   (d) display means for displaying the content set in the counter means,
   (e) a set value detecting circuit for detecting the content of the counter means producing a limit signal and for disabling the counting operation of said counter means when the content of the counter means has reached a predetermined value, so that the counter means stops counting the pulses from the pulse forming means to the counter means in response to the limit signal.

20. A device for manually setting photographic information comprising:
   (a) a manually operated switch for setting information, and for producing an information setting signal at the time of the operation,
   (b) a clock pulse generator,
   (c) counter means for counting one pulse when the switch is operated,
   (d) a count control circuit, said circuit transmitting the pulse formed by means of the switch and transmitting the clock pulses from the clock pulse generator to the counter means in response to the information setting signal after lapse of a given time after the information setting signal has been produced.

21. A device for manually setting photographic information in accordance with claim 20 wherein the count control circuit includes:
   a timer circuit operated in response to the information setting signal so as to produce an output after lapse of a given time; and
   a gate circuit coupled to the clock pulse generator and the counter means as well as the timer circuit, for transmitting the clock pulses from the clock pulse generator to the counter means in response to the output of the timer circuit.

22. A system for manually setting a photographic information into a digital exposure control circuit of a camera comprising:
 (a) pulse forming means for producing pulses;
 (b) a counter means;
 (c) indicating means connected to the counter for indicating an exposure information to be set corresponding to the content stored in the counter;
 (d) switching means for setting the exposure information to the counter;
 (e) control circuit connected to the switching means and said pulse forming means, said control circuit transmits pulses from the pulse forming means to the counter means when the switching means actuated and said circuit transmits one pulse to the counter when the time interval of actuation of the switching means is shorter than a predetermined time interval and transmits a number of pulses corresponding to the time interval of actuation of the switching means to the counter means when the time interval of actuation of the switching means is longer than said predetermined time interval.

23. A photographic information display circuit for displaying photographic information comprising:
 (a) pulse forming means for producing pulses,
 (b) counter means for counting the pulses from the pulse forming means,
 (c) manually operable information setting means,
 (d) signal forming means for forming a count control signal which makes the counter means count the pulses from the pulse forming means, said signal forming means forming the count control signal during operation of the information setting means,
 (e) a light measuring circuit for producing a digital value corresponding to the intensity of light from the object,
 (f) an operation circuit connected to the counter means and the light measuring circuit so as to produce a digital calculated exposure value on the basis of the object brightness and the exposure value set at the counter means,
 (g) first display means connected to the counter means so as to display the exposure value in the counter means in response to a display control signal,
 (h) second display means connected to the operating circuit so as to display the calculated exposure value produced by the operating circuit in response to the display control signal, and
 (i) a display control circuit for transmitting the display control signal to the first display means in response to the count control signal so as to display the set exposure value by means of the first display means and for transmitting the display control signal to the second display means so as to display the calculated exposure value when the count control signal disappears.

24. A photographic information display circuit in accordance with claim 23, wherein the display control circuit further includes:
 (a) a first gate circuit connected to the first display means for transmitting the content of the counter means to the first display means, and
 (b) a second gate circuit coupled to the second display means for delivering the output signal of the operation circuit to the second display means in response to cessation of the count control signal.

25. A photographic information display circuit in accordance with claim 23, wherein a set value detecting circuit connected to the counter means delivers a limit value signal when the output of the counter means reaches a predetermined digital value and said second display means displays the calculated exposure value when said limit value signal appears.

26. A photographic information display circuit in accordance with claim 25, wherein the counter means interrupts the input of the pulses from the pulse forming means in response to the limit value signal.

27. A photographic information display circuit in accordance with claim 25, wherein the display control circuit includes pulse generating means and a gate circuit which is opened in response to the limit value signal of the set value so as to deliver the display control signal at the frequency of the pulse generating means in such a manner that the limit value of the set value is flashed when the limit value signal is delivered.

28. A photographic information display circuit in accordance with claim 23, wherein a calculated value detecting circuit connected to the output terminal of the operation circuit delivers an alarm signal when the output of the operation circuit reaches a given digital value, said second display means displaying the calculated exposure value when the alarm signal appears.

29. A photographic information display circuit in accordance with claim 28, wherein the counter means interrupts the input of the pulses from the pulse forming means in response to the alarm signal.

30. A photographic information display circuit in accordance with claim 28, wherein the display control circuit includes pulse generating means, wherein the display control signal is delivered at the frequency of the pulse generating means in response to the alarm signal so as to flash the calculated exposure value at the frequency of the pulse generating means when the alarm signal is delivered.

31. A photographic information display circuit in accordance with claim 23, wherein the counter means includes a preset input terminal connected to the light measuring circuit and a presettable control signal input terminal for entering the digital value at the preset terminal of the counter means, and a power source switch coupled to a source of power, signal forming means coupled to the power source switch and the presettable control signal input terminal so that the content of the counter means assumes a value corresponding to the object brightness when the power source switch is closed.

32. A photographic information display circuit in accordance with claim 23, wherein the counter means includes preset input terminals and a presettable control signal input terminal for entering a digital value applied to the preset input terminals, and further comprising digital signal forming means connected to the preset input terminal of the counter and delivering a given digital value, a power source switch coupled to a source of power, a signal forming circuit for producing an output when the power source switch is closed and connected to the presettable control signal input terminal to set the content of the counter means at the predetermined digital value when the power source switch is closed.

33. A photographic information display circuit in accordance with claim 23, wherein the counter means includes a preset input terminal connected to the operation circuit and a presettable control signal input terminal for entering a digital value at the present input terminals, and further comprising mode selector means for changing the photgraphic mode and a control signal forming circuit coupled with the mode selector means and the presettable control signal input terminal for delivering a control signal to the input terminal so as to enter the output of the operation circuit in the counter means when the mode is changed by the selector means.

* * * * *